United States Patent
Sasayama

(10) Patent No.: US 8,164,791 B2
(45) Date of Patent: Apr. 24, 2012

(54) IMAGE RECORDING APPARATUS AND METHOD

(75) Inventor: Hiroyuki Sasayama, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 597 days.

(21) Appl. No.: 12/412,166

(22) Filed: Mar. 26, 2009

(65) Prior Publication Data

US 2009/0244575 A1    Oct. 1, 2009

(30) Foreign Application Priority Data

Mar. 27, 2008   (JP) .................................. 2008-083375

(51) Int. Cl.
    *G06F 15/00* (2006.01)
(52) U.S. Cl. .......... 358/1.9; 358/1.2; 358/2.1; 358/3.01; 358/3.06; 358/3.24; 358/3.26; 358/296; 358/502; 358/521; 347/5; 347/9; 347/10; 347/11; 347/12; 347/14; 347/15; 347/19; 347/43; 347/101; 347/104; 347/105
(58) Field of Classification Search .......... None
    See application file for complete search history.

(56) References Cited

U.S. PATENT DOCUMENTS

| | | | |
|---|---|---|---|
| 6,113,210 A * | 9/2000 | Gotoh et al. ................ | 347/15 |
| 7,484,824 B2 | 2/2009 | Chiwata | |
| 7,537,305 B2 | 5/2009 | Chiwata | |
| 2002/0122087 A1 * | 9/2002 | Ishikawa et al. ............ | 347/15 |
| 2004/0189729 A1 * | 9/2004 | Nakahanada et al. ........ | 347/14 |
| 2004/0252148 A1 * | 12/2004 | Shibata et al. .............. | 347/14 |
| 2008/0253779 A1 * | 10/2008 | Torii .......................... | 399/18 |
| 2010/0039469 A1 * | 2/2010 | Shimosato et al. .......... | 347/14 |

FOREIGN PATENT DOCUMENTS

| | | |
|---|---|---|
| JP | 2006-212907 A | 8/2006 |
| JP | 2006-347164 A | 12/2006 |
| JP | 2007-125877 A | 5/2007 |
| JP | 2007-160748 A | 6/2007 |

* cited by examiner

*Primary Examiner* — James A Thompson
*Assistant Examiner* — Miya J Cato
(74) *Attorney, Agent, or Firm* — Birch, Stewart, Kolasch & Birch, LLP

(57) ABSTRACT

An image recording apparatus includes: a recording head having plural recording elements; a characteristics information acquisition device; a correction calculation device which corrects image data using recording point positional deviation information within acquired characteristics information, and generates image data suppressing a non-uniformity streak in an output image; a nearest recording point specifying device specifying, when image density is outside an output image density range, a second recording element concerning a recording position nearest to a recording position of a first recording element corresponding to first image data outside the output image density range; a sum density calculation device calculating sum density of the first image data and second image data; an image data modification device which preserves the calculated slim density; and a drive control device controlling driving of the recording head in accordance with the corrected image data and modified image data.

8 Claims, 26 Drawing Sheets

STANDARD DROPLET
DEPOSITING POSITIONS

POSITIONS WITH
POSITIONAL ERROR

CALCULATED CORRECTION
DENSITY

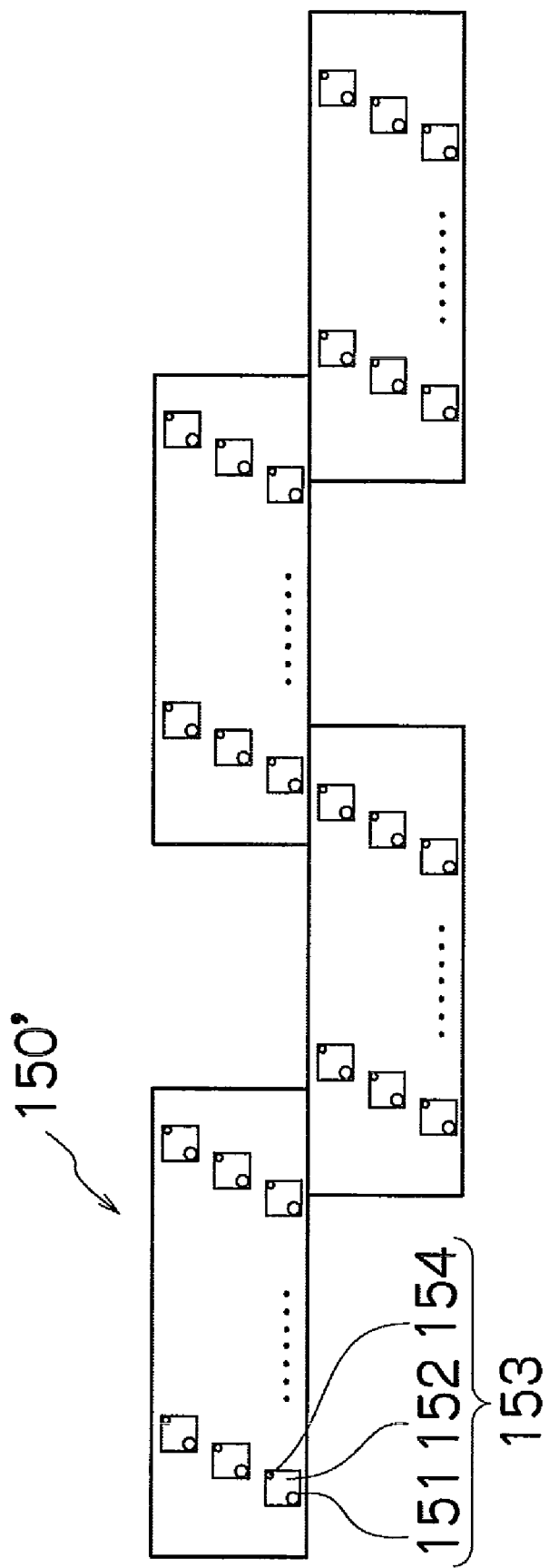

FIG.18

| NOZZLE | DOT DENSITY |
|---|---|
| 0 | 0.710715 |
| 1 | 1.17498 |
| 2 | 1.116391 |
| 3 | 1.0539 |
| 4 | 0.923797 |
| 5 | 1.060527 |
| 6 | 1.255553 |
| 7 | 0.759732 |
| 8 | 0.905556 |
| 9 | 0.849231 |
| 10 | 1.163451 |
| 11 | 1.272993 |
| 12 | 1.05962 |
| 13 | 0.724254 |
| 14 | 1.122478 |
| 15 | 1.146226 |
| 16 | 1.009966 |
| 17 | 1.19597 |
| 18 | 0.626254 |
| 19 | 0.589426 |

IMAGE RECORDING APPARATUS AND METHOD

BACKGROUND OF THE INVENTION

1. Field of the Invention

The present invention relates to an image recording apparatus and an image recording method, and more particularly to image correction processing technology which is suitable for correcting density variations caused by variation in characteristics among a plurality of recording elements in a recording head.

2. Description of the Related Art

An image recording apparatus (inkjet printer) has been used which includes an inkjet type of recording head having a plurality of ink ejection ports (nozzles). In this type of image recording apparatus, problems of image quality are liable to arise due to the occurrence of density variations (density non-uniformities) in the recorded image caused by variations in the ejection characteristics of the nozzles. FIG. 21 is an illustrative diagram showing a schematic view of examples of variations in the ejection characteristics of the nozzles, and density variations appearing in recording results.

In FIG. 21, reference numeral 300 represents a line head, reference numeral 302-$i$ (where i=1 to 8) represents a nozzle, reference numeral 304-$i$ (i=1 to 8) represents a dot formed by a droplet ejected from the nozzle 302-$i$ (i=1 to 8). Here, it is supposed that the recording medium, such as recording paper, is conveyed in a direction perpendicular to the breadthways direction of the line head 300 (the nozzle arrangement direction) (namely, in the direction of arrow S), and the nozzle arrangement direction in the line head 300 is taken to be the main scanning direction, while the direction of relative conveyance of the recording medium with respect to the line head 300 (the direction S) is taken to be the sub-scanning direction.

In the example shown in FIG. 21, a depositing position error occurs at the nozzle 302-3, which is third from the left (namely, the droplet ejected from the nozzle 302-3 deposits on the recording medium at a position diverging from the originally intended depositing position in the leftward direction in FIG. 21), and a droplet volume error occurs at the sixth nozzle 302-6 (namely, the droplet ejected from the nozzle 302-6 has a greater droplet volume than the originally intended volume). In this case, density non-uniformity streaks occur at the positions in the print image corresponding to the nozzles 302-3 and 302-6 producing the depositing position error and the droplet volume error (namely, the positions indicated by A and B in FIG. 21).

In the case of a serial (shuttle) scanning type of image recording apparatus, which performs image recording by driving a recording head to scan a plurality of times over the prescribed print region, it is possible to avoid density non-uniformities by means of a commonly known multi-pass printing method, but in the case of a single pass system (line head system) which records images by means of a single scanning action, it is difficult to avoid density non-uniformities.

Since it is difficult to completely prevent variations in ejection characteristics among the nozzles in terms of the process of manufacturing the recording head, then various technologies for correcting the variations have been proposed (see, Japanese Patent Application Publication No. 2007-125877 and U.S. Pat. No. 7,484,824).

With the object of eliminating stripe-shaped non-uniformities (banding) caused by a so-called "flight deflection effect", Japanese Patent Application Publication No. 2007-125877 discloses technology which changes the density of the pixels of the image data allocated to particular dot rows (namely, changing the dot size, dot pattern, or the like) if there is deviation in the interval between dot rows, so as to suppress non-uniformity streaks. According to this, the density range (L2) of the image data is determined so as not to use a region (region C) where banding cannot be corrected, as confirmed on an output density map (FIG. 13 of Japanese Patent Application Publication No. 2007-125877) relating to the amount of deviation in dot pitch.

U.S. Pat. No. 7,484,824 describes, in columns 10 to 14, outputting a test pattern, obtaining depositing position error data from the print results, using this depositing position error data to define a density profile D(x) which incorporates the error characteristics of respective nozzles, converting this density profile into a function T(f) by Fourier transform and then calculating a density correction coefficient by minimizing the low-frequency component of the power spectrum of this function.

However, with the technology described in Japanese Patent Application Publication No. 2007-125877, the density range of the image data is determined on the basis of information about the droplet depositing positions where there is greatest positional displacement, and hence this leads to decline in the resolution of the output image density. On the other hand, U.S. Pat. No. 7,484,824 does not mention density output limits, and therefore when calculating correction, abnormally large density values or abnormally small (or negative) density values may be derived. If the apparatus output is not able to handle the abnormal values thus calculated, then correction can not be complete.

In other words, in the case of a method which corrects for banding by using information about the droplet depositing positions, as in U.S. Pat. No. 7,484,824, then the interval between adjacent droplet depositing positions may become extremely large or extremely small (close to zero), depending on the depositing position error of the ejected droplets. On the other hand, since the output apparatus (printer) has a set output density range and is not able to output densities outside that range, then problems will occur if it is sought to output the corrected densities without taking this density range into account.

One possible method for resolving this method is to set an upper limit value and a lower limit value for the corrected density, and to restrict any values outside these limits to the limit values. However, in the case of this method, problems occur, such as the fact that the density of the image data (input density) and the picture (image contents) are not reflected accurately in the output, the density resolution declines, and so on.

SUMMARY OF THE INVENTION

The present invention has been contrived in view of these circumstances, an object thereof being to eliminate the problems described above by providing an image recording apparatus and an image recording method whereby highly accurate density correction (suppression of banding) can be achieved, and a computer readable medium having embodied thereon an image processing program which is valuable in correction processing of the apparatus and method.

In order to attain the aforementioned object, the present invention is directed to an image recording apparatus which records an image on a recording medium, comprising: a recording head which has a plurality of recording elements; a conveyance device which conveys at least one of the recording head and the recording medium so that the recording head and the recording medium move relatively to each other; a characteristics information acquisition device which acquires characteristics information that indicates recording characteristics of the respective recording elements; a correction calculation device which corrects image data corresponding to the respective recording elements by using at least recording point positional deviation information within the acquired characteristics information, and generates image data that suppresses a non-uniformity streak occurring in an output image due to the recording characteristics; a nearest recording point specifying device which specifies, in a case where an image density value indicated by the image data corrected by the correction calculation device is out of an output image density range of the recording head, a second recording element concerning a recording position nearest to a recording position of a first recording element corresponding to first image data that is out of the output image density range; a sum density calculation device which calculates a sum density of the first image data and second image data, the first image data corresponding to the first recording element, the second image data corresponding to the specified second recording element and having been corrected by the correction calculation device for the image data corresponding to the specified second recording element; an image data modification device which preserves the sum density calculated by the sum density calculation device, while distributing the sum density to respective image data corresponding to the first recording element and the second recording element, at values within the output density range; and a drive control device which controls driving of the recording head in accordance with the image data corrected by the correction calculation device and the image data modified by the image data modification device.

According to this aspect of the present invention, if the image density corrected in accordance with the density correction data is out of the possible output range of the recording head, then for a pair of recording points consisting of a recording point (droplet depositing point) having an image density that is out of the output image density range, and the other recording point that is nearest to this exceeding recording point, the sum of the densities corresponding to the two points is distributed to the pixel densities of the two recording points in such a manner that the sum density does not change. In this case, the density values distributed to the respective recording points are values within the output image density range, and since the sum density of the two recording points is maintained, then suitable density correction can be achieved.

The "characteristics information acquisition device" may acquire information by storing information relating to recording failure positions, previously, in a storage device such as a memory, and then reading out the required information, or it may acquire information relating to recording characteristics by printing an actual test pattern, or the like, and then reading in and analyzing the print results. Considering that the recording characteristics change over time, a desirable mode is one in which the information is updated at suitable times.

The processing for correcting the image data and modifying the image data according to the present invention is desirably carried out in respect of the image data at the stage before the screening process (digital halftoning for converting the data to binary or multiple-value dot data).

In other words, screening is carried out on the basis of the image data which has been corrected by the correction calculation device and the image data which has been modified by the image data modification device, thereby converting the data to binary dot data or multiple-value dot data (multiple values corresponding to the different dot sizes) which corresponds to the recording elements of the recording head. An image is formed on the recording medium by controlling the recording head on the basis of this dot data.

An inkjet recording apparatus which serves as an image recording apparatus according to an embodiment of the present invention comprises: a liquid ejection head (corresponding to a "recording head") having a droplet ejection element row in which a plurality of droplet ejection elements (corresponding to "recording elements") are arranged in a row, each droplet ejection element including a nozzle for ejecting an ink droplet in order to form a dot and a pressure generating device (piezoelectric element, heating element, or the like) which generates an ejection pressure; and an ejection control device which controls the ejection of droplets from the recording head on the basis of dot data (ink ejection data) generated from the image data. An image is formed by recording dots on a recording medium by means of the droplets ejected from the nozzles.

A compositional example of a recording head is a full line type head having a recording element row in which a plurality of recording elements are arranged through a length corresponding to the full width of the recording medium. In this case, a mode may be adopted in which a plurality of relatively short recording head modules having recording element rows which do not reach a length corresponding to the full width of the recording medium are combined and joined together, thereby forming recording element rows of a length that correspond to the full width of the recording medium.

A full line type head is usually arranged in a direction that is perpendicular to the relative feed direction (relative conveyance direction) of the recording medium, but a mode may also be adopted in which the recording head is arranged following an oblique direction that forms a prescribed angle with respect to the direction perpendicular to the conveyance direction.

The "recording medium" indicates a medium on which an image is recorded by means of the action of the recording head (this medium may also be called an image forming medium, print medium, image receiving medium, or, in the case of an inkjet recording apparatus, an ejection medium or ejection receiving medium, or the like). This term includes various types of media, irrespective of material and size, such as continuous paper, cut paper, sealed paper, resin sheets, such as OHP sheets, film, cloth, an intermediate transfer body, a printed circuit board on which a wiring pattern, or the like, is printed by means of an inkjet recording apparatus, and the like.

The "conveyance device" may include a mode where the recording medium is conveyed with respect to a stationary (fixed) recording head, or a mode where a recording head is moved with respect to a stationary recording medium, or a mode where both the recording head and the recording medium are moved.

When forming color images by means of an inkjet head, it is possible to arrange recording heads for inks of a plurality of colors (recording liquids), or it is possible to eject inks of a plurality of colors from a single recording head.

Furthermore, the present invention is not limited to a full line head, and may also be applied to a serial (shuttle) scanning type recording head (a recording head which ejects droplets while moving reciprocally in a direction substantially perpendicular to the conveyance direction of the recording medium).

Preferably, the correction calculation device includes a density correction data calculation device which calculates density non-uniformity caused by the recording characteristics of the recording elements and calculates density correction data in accordance with correction conditions which reduce a low-frequency component of a power spectrum that represents spatial frequency characteristics of the density non-uniformity, and the correction calculation device performs correction of the image data by using the calculated density correction data.

Irregularities in the density of a recorded image (density non-uniformities) can be represented by the intensity of the spatial frequency characteristics (power spectrum), and the visibility of a density non-uniformity can be evaluated by means of the low-frequency component of the power spectrum. Since the density correction coefficients are specified by using conditions under which the differential coefficient at the frequency origin point (f=0) of the power spectrum after correction using the density correction data becomes substantially zero, then the intensity of the power spectrum becomes a minimum at the frequency origin point and the power spectrum restricted to a low value in the vicinity of the origin (in other words, in the low-frequency region). Accordingly, highly accurate correction of non-uniformity can be achieved.

Preferably, the image data modification device divides the sum density into two equal parts to be distributed to the respective image data corresponding to the first recording element and the second recording element.

A possible mode of a method of distributing the sum density within the output image density range is one where the sum density is distributed by being divided into two equal parts (i.e., averaged).

It is also preferable that the image data modification device performs distribution, with an upper limit value of the output image density range being set for one of the image data having higher density, of the first image data and the second image data, while a remainder of the sum density minus the upper limit value being set for the other one of the image data.

A further method of distributing the sum density within the output image density range is a mode where the upper limit value of the output image density range is assigned to one pixel and a value obtained by subtracting the upper limit value from the sum density is assigned to the other pixel.

It is also preferable that the image data modification device performs distribution, with a lower limit value of the output image density range being set for one of the image data having lower density, of the first image data and the second image data, while a remainder of the sum density minus the lower limit value being set for the other one of the image data.

A further method of distributing the sum density within the output image density range is a mode where the lower limit value of the output image density range is assigned to one pixel and a value obtained by subtracting the lower limit value from the sum density is assigned to the other pixel.

It is also preferable that the image recording apparatus further comprises: a comparison device which compares the image density value indicated by the first image data with an upper limit value and a lower limit value of the output image density range, wherein: if the image density value indicated by the first image data is higher than the upper limit value, then the image data modification device performs distribution, with the upper limit value being set for the image data corresponding to the first recording element, while a remainder of the sum density minus the upper limit value being set for the image data corresponding to the second recording element; and if the image density value indicated by the first image data is lower than the lower limit value, then the image data modification device performs distribution, with the lower limit value being set for the image data corresponding to the first recording element, while a remainder of the sum density minus the lower limit value being set for the image data corresponding to the second recording element.

In order to attain the aforementioned object, the present invention is also directed to a method of recording an image on a recording medium by a plurality of recording elements of a recording head, while moving the recording head and the recording medium relatively to each other by conveying at least one of the recording head and the recording medium, the method comprising: a characteristics information acquisition step of acquiring characteristics information that indicates recording characteristics of the respective recording elements; a correction calculation step of correcting image data corresponding to the respective recording elements by using at least recording point positional deviation information within the acquired characteristics information, and generating image data that suppresses a non-uniformity streak occurring in an output image due to the recording characteristics; a nearest recording point specifying step of specifying, in a case where an image density value indicated by the image data corrected in the correction calculation step is out of an output image density range of the recording head, a second recording element concerning a recording position nearest to a recording position of a first recording element corresponding to first image data that is out of the output image density range; a sum density calculation step of calculating a sum density of the first image data and second image data, the first image data corresponding to the first recording element, the second image data corresponding to the specified second recording element and having been corrected in the correction calculation step for the image data corresponding to the specified second recording element; an image data modification step of preserving the sum density calculated in the sum density calculation step while distributing the sum density to respective image data corresponding to the first recording element and the second recording element, at values within the output density range; and a drive control step of controlling driving of the recording head in accordance with the image data corrected in the correction calculation step and the image data modified in the image data modification step.

In order to attain the aforementioned object, the present invention is also directed to a computer readable medium having embodied thereon a computer program for causing a computer to operate: a characteristics information acquisition function of acquiring characteristics information that indicates recording characteristics of a plurality of recording elements of a recording head; a correction calculation function of correcting image data corresponding to the respective recording elements by using at least recording point positional deviation information within the acquired characteristics information, and generating image data that suppresses a non-uniformity streak occurring in an output image due to the recording characteristics; a nearest recording point specifying function of specifying, in a case where an image density value indicated by the image data corrected with the correction calculation function is out of an output image density range of the recording head, a second recording element concerning a recording position nearest to a recording position of a first recording element corresponding to first image data that is out of the output image density range; a sum density calculation function of calculating a sum density of the first image data and second image data, the first image data corresponding to the first recording element, the second image data corresponding to the specified second recording element and having been corrected with the correction calculation function for the image data corresponding to the specified second recording element; and an image data modification function of preserving the sum density calculated with the sum density calculation function while distributing the sum density to respective image data corresponding to the first recording element and the second recording element, at values within the output density range.

The computer readable medium according to this aspect of the present invention may be used for operating a central processing unit (CPU) incorporated into a printer, and it may also be used for a computer system, such as a personal computer.

Furthermore, the computer readable medium may contain stand-alone application software, or it may include a part of another application, such as image editing software. This computer readable medium can be a CD-ROM, a magnetic disk, or other information storage medium (an external storage device), and the computer readable medium may be provided to a third party in the form of such an information storage medium, or a download service for the program may be offered by means of a communications circuit, such as the Internet.

According to the present invention, it is possible to correct density non-uniformities caused by variations in the recording characteristics of recording elements, with high accuracy, and hence images of high quality can be formed.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 13C is a plan view perspective diagram showing a further example of the structure of a full line head;

FIG. 18 is a diagram showing an example of a portion of a density distribution look-up table;

DETAILED DESCRIPTION OF THE PREFERRED EMBODIMENTS

Description of Principles of Correction During Normal Correction

Firstly, technology for carrying out correction of banding by using information on the droplet depositing positions will be described. In the correction method described here, when correcting the depositing position error of a particular nozzle, correction is performed by using N peripheral nozzles which surround that nozzle. In terms of basic principles, it is possible to use the method described in U.S. Pat. No. 7,484,824.

Figure 1:
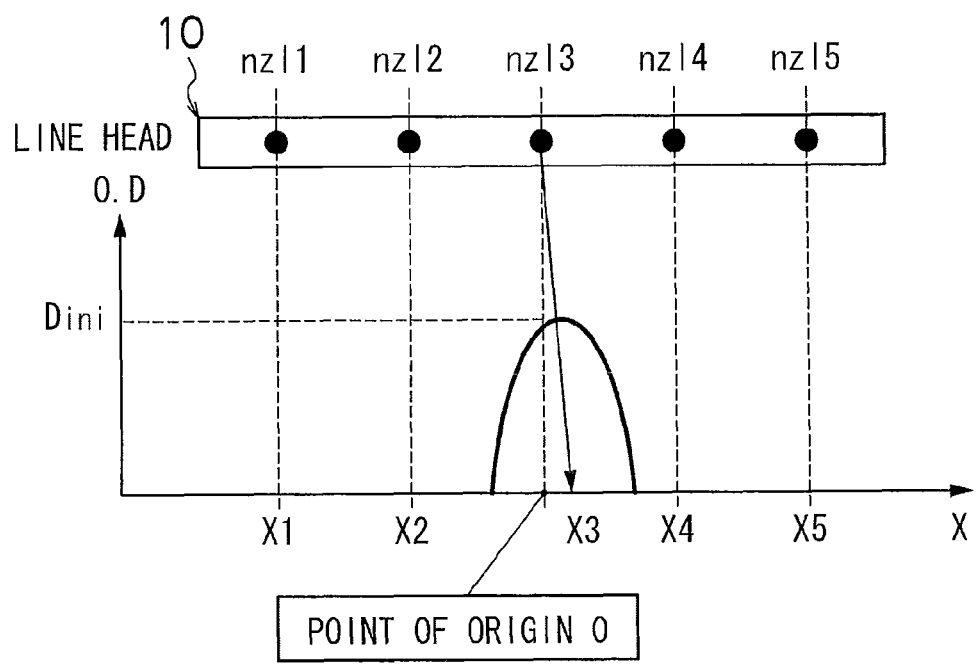
FIG. 1 is an illustrative diagram showing a density profile before correction of density non-uniformity according to an embodiment of the present invention.

FIG. 1 is a diagram showing a state before correction. In FIG. 1, the third nozzle (nzl3) from the left in a line head 10 (which is equivalent to a "recording head") has a depositing position error, and hence the depositing position is displaced from the ideal depositing position (the origin O) in the rightward direction in the diagram (the main scanning direction indicated by the X axis in FIG. 1). Furthermore, the graph shown in the bottom part of FIG. 1 indicates the density profile in the nozzle column direction (main scanning direction), obtained by averaging the print density produced by the droplets ejected from each nozzle in the conveyance direction of the recording medium (the sub-scanning direction). Here, since correction relating to the printing by the nozzle nzl3 is considered in FIG. 1, the density outputs of the nozzles other than the nozzle nzl3 are not shown in FIG. 1. The horizontal axis (X axis) represents the position in the main scanning direction, and the vertical axis represents the optical density (O. D.).

The initial output density of each of the nozzles nzl1 to nzl5 is $D_i=D_{INI}$ (where i is the nozzle number of 1, 2, 3, 4 or 5, and $D_{INI}$ is a uniform value), the origin O is set at the ideal depositing position of the nozzle nzl3, and the depositing position of each of the nozzles nzl1 to nzl5 is $X_i$.

Here, $D_i$ represents the output optical density of the nozzle when averaged physically in the recording medium conveyance direction, and corresponds to the averaged density data D(i, j) of pixels (where i is the nozzle number, and j is the pixel number in the conveyance direction of the recording medium) that is calculated as an average with respect to "j".

As shown in FIG. 1, the depositing position error of the nozzle nzl3 is represented by the divergence of the density output of the nozzle nzl3 (thick line) from the origin point O.

The correction of this divergence in the output density is described below.

Figure 2:
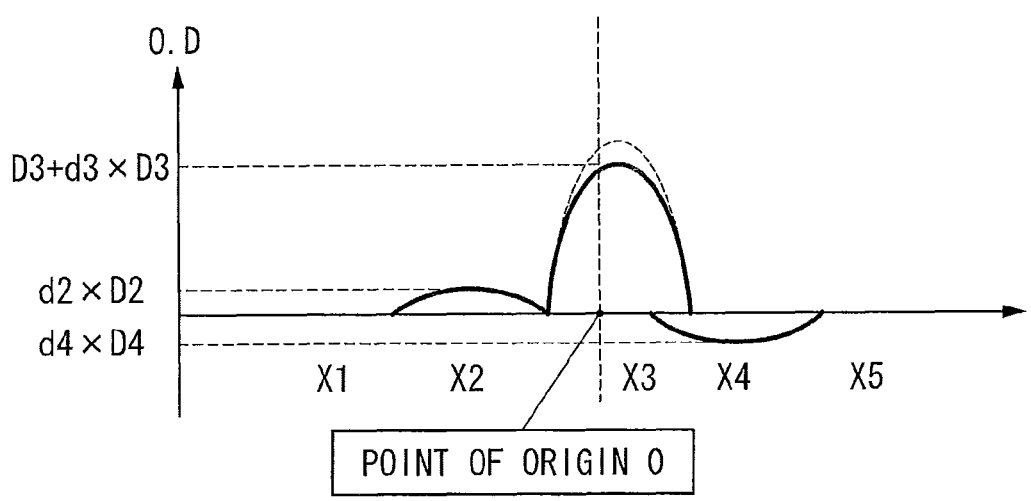
FIG. 2 is an illustrative diagram showing a state after correction of density non-uniformity according to an embodiment of the present invention.

FIG. 2 is a diagram showing a state after correction. Here, the density output for the nozzle nzl3 is shown together with the correction components. In the case of FIG. 2, the number of nozzles used in correction is N=3, and the nozzles nzl2, nzl3 and nzl4 are weighted (multiplied) with density correction coefficients d2, d3 and d4, respectively. The density correction coefficients $d_i$ described here are defined as $D'_s = D_i + d_i \times D_i$, where $D'_i$ are the output densities after correction.

In the present embodiment, the density correction coefficient of each nozzle is determined so as to minimize the visibility of the density non-uniformity.

It has been known that the visibility of a spatial structure, such as density non-uniformity, can be evaluated on the basis of the spatial frequency characteristics (see, for example, "Application of Fourier Analysis to the Visibility of Gratings", Journal of Physiology, 197, 551 to 566 (1968) F. W. Campbell and J. G. Robson 1967, "Noise Perception in Electrophotography", Journal of Applied Photographic Engineering 5: 190 to 196 (1979) R. P. Dooley ad R. Shaw), and it is clear that human vision has high sensitivity to low-frequency components, and this sensitivity declines as the frequency increases. In other words, it is suitable to use the low-frequency energy of the spatial frequency characteristics as a measure of the visibility of a density non-uniformity. Therefore, in the present embodiment, the density correction coefficient for each nozzle is determined so as to minimize the low-frequency component of the power spectrum.

The details of the derivation of the equation for specifying the density correction coefficient $d_i$ are described later, but to state the result in advance, the density correction coefficient $d_i$ corresponding to the depositing position error of a particular nozzle (correction object nozzle) is specified by means of the following equation:

$$d_i = \begin{cases} \dfrac{\prod_k x_k}{x_i \cdot \prod_{k \neq i} (x_k - x_i)} - 1 & \text{(for the correction object nozzle)} \\ \dfrac{\prod_k x_k}{x_i \cdot \prod_{k \neq i} (x_k - x_i)} & \text{(for nozzles other than the correction object nozzle)} \end{cases} \quad (1)$$

where $x_i$ is the depositing position of each nozzle, taking the origin at the ideal depositing position of the correction object nozzle; and $\Pi$ means that the product is found for the N nozzles used for correction.

<Calculation of Density Correction Coefficients>

It is possible to logically derive the density correction coefficient for each nozzle from the conditions for minimizing the low-frequency component of the power spectrum of the density non-uniformity.

Firstly, a density profile $D(x)$ incorporating the error characteristics of each nozzle is defined as:

$$D(x) = \sum_i D_i \cdot z(x - x_i), \quad (2)$$

where i is the nozzle number, x is the positional coordinate on the medium (in the nozzle column direction), $D_i$ is the nozzle output density (the height of peak), $z(x)$ is the standard density profile (where x=0 is the center of gravity), and $x_i = \bar{x}_i + \Delta x_i$ is the depositing position of the i-th nozzle (the ideal position+the error).

The density profile $D(x)$ of the image is the sum of the density profiles printed by the nozzles, and the print model represents the printing performed by each nozzle (the density profile printed by each nozzle). The print model is represented separately by the nozzle output density $D_i$ and the standard density profile $z(x)$.

The standard density profile $z(x)$ has a limited spread equal to the dot diameter in strict terms, but if the correction of positional errors is considered to be a problem of balancing divergences in the density, then the important element is the central position (depositing position) of the density profile and the spread of the density profile is a secondary factor. Hence, an approximation that converts the profile by means of a δ function is appropriate. When a standard density profile represented with a δ function is supposed, then an arithmetical treatment can be achieved readily, and a precise solution for the correction coefficients can be obtained.

Figure 3:
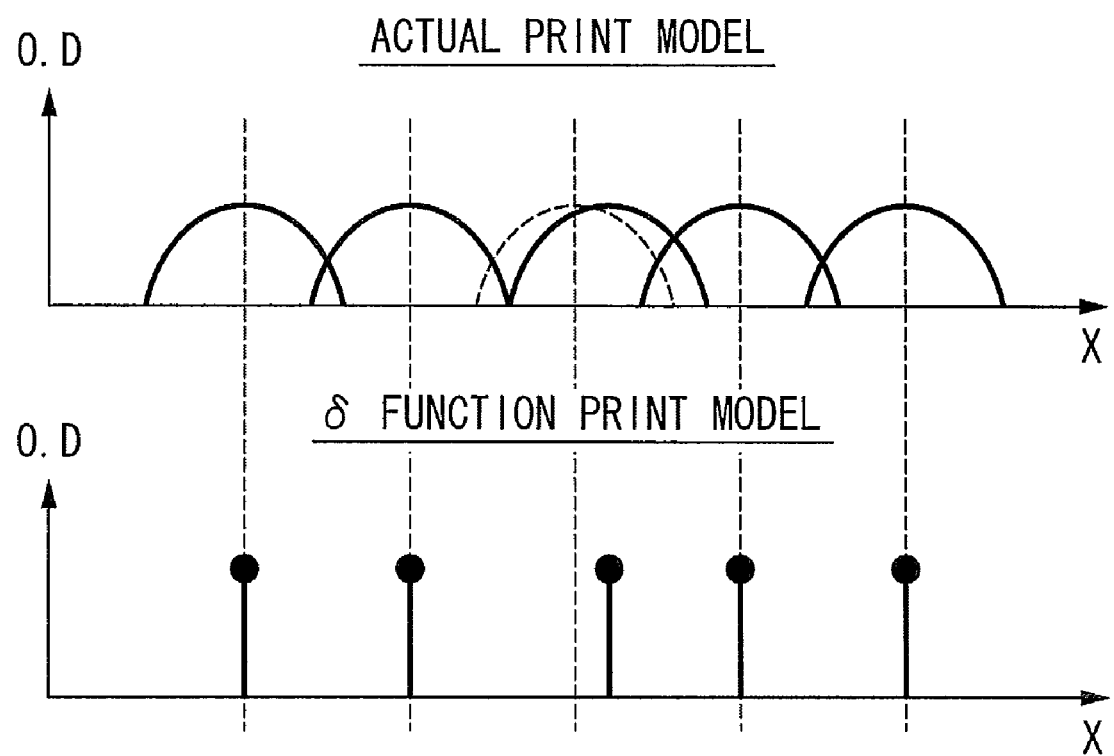
FIG. 3 is a graph of density profiles of an actual print model and a δ function type of print model

FIG. 3 shows a graph of density profiles of an actual print model and a δ function type of print model. The standard density profile is represented as approximation using the δ function model as:

$$z(x - x_i) = \delta(x - x_i). \quad (3)$$

In calculating the correction coefficients, it is considered that the depositing position error $\Delta x_0$ of a particular nozzle (i=0) is to be corrected by means of the N pieces of nozzles including the particular nozzle and the nozzles surrounding the particular nozzle. Here, the number of the nozzle to be corrected is i=0. Attention is paid to the fact that each of the surrounding nozzles may also have a prescribed depositing position error.

The numbers (indexes) of the N nozzles including the nozzle to be corrected (central nozzle) are represented as:

$$\text{Nozzle index: } i = -\frac{N-1}{2}, \ldots, -1, 0, 1, \ldots, \frac{N-1}{2}. \quad (4)$$

The number N must be an odd number in this expression, but in implementing the present invention, the number N is not necessarily limited to being an odd number.

The initial output density (the output density before correction) has a value only if i=0, and is represented as follows:

$$D_i = \begin{cases} D_{INI} & (i = 0) \\ 0 & (i \neq 0) \end{cases}. \quad (5)$$

When the density correction coefficients are $d_i$, then the output densities $D'_i$ after correction are represented as follows:

$$D'_i = D_i + d_i \times D_{INI} = d'_i \times D_{INI}, \quad (6)$$

where $$d'_i = \begin{cases} d_i + 1 & (i = 0) \\ d_i & (i \neq 0). \end{cases}$$

In other words, when $i=0$, the corrected output density is the sum of the initial output density value and the correction value ($d_i \times D_{INI}$), and when $i \neq 0$, the corrected output density is equal to the correction value only.

The depositing position $x_i$ of each nozzle i is represented as:

$$x_i = \bar{x}_i + \Delta x_i, \quad (7)$$

where $\bar{x}_i$ is the ideal depositing position, $\Delta x_i$ is the depositing position error, and the ideal depositing position of the correction object nozzle is set as the origin ($\bar{x}=0$).

When using a $\delta$ function type of print model, the density profile after correction is expressed as follows:

$$D(x) = \sum_{i=-(N-1)/2}^{i=(N-1)/2} D'_i \cdot \delta(x - x_i) = D_{INI} \cdot \sum_{i=-(N-1)/2}^{i=(N-1)/2} d'_i \cdot \delta(x - x_i). \quad (8)$$

By Fourier transform on this equation, the following equation is obtained:

$$T(f) = \quad (9)$$

$$\int_{-\infty}^{\infty} D(x) \cdot e^{ifx} dx = \sum_i d'_i \cdot \int_{-\infty}^{\infty} \delta(x - x_i) \cdot e^{ifx} dx = \sum_i d'_i \cdot e^{ifx_i},$$

where $D_{INI}$ is omitted since it is a common constant.

Minimizing the visibility of density non-uniformities means minimizing the low-frequency components of the power spectrum expressed as:

Power spectrum $= \int T(f)^2 df$. $\quad (10)$

This can be approximated arithmetically by taking the differential coefficients (of the first-order, the second-order, ...) for $f=0$ in $T(f)$ to be zero. Since there are N unknown numbers $d'_i$, then if conditions are used where the differential coefficients up to the (N−1)-th order are zero, and also including the condition for maintaining the direct current (DC) component, then all (N) of the unknown numbers $d'_i$ can be specified precisely. Thus, the following correction conditions are specified:

DC component: $T(f=0)=1$ (condition for preserving the DC component); $\quad (11)$ First-order coefficient $\dfrac{d}{df} T(f=0) = 0; \quad (12)$ Second-order coefficient $\dfrac{d^2}{df^2} T(f=0) = 0; \quad (13)$

...

(N−1)-th order coefficient $\dfrac{d^{N-1}}{df^{N-1}} T(f=0) = 0. \quad (14)$

In the $\delta$ function model, when the correction conditions are developed, N simultaneous equations relating to Di are reached by means of a simple calculation. When the correction conditions are rearranged, the following group of conditions (group of equations) is obtained:

$\Sigma d'_i = 1; \quad (15)$ $\Sigma x_i d'_i = 0; \quad (16)$ $\Sigma x_i^2 d'_i = 0; \quad (17)$ $\Sigma x_i^{N-1} d'_i = 0. \quad (18)$ The meaning of this group of equations is that the first equation represents the preservation of the DC component and the second equation represents the preservation of the central position. The third and subsequent equations represent the fact that the (N−1)-th moment in the statistical calculation is zero.

The conditional equations thus obtained can be represented with a matrix format as follows:

$$\begin{pmatrix} 1 & \ldots & 1 & \ldots & \ldots & 1 \\ x_{-(N-1)/2} & \ldots & x_0 & \ldots & \ldots & x_{(N-1)/2} \\ x^2_{-(N-1)/2} & \ldots & x_0^2 & & \ldots & x^2_{(N-1)/2} \\ \vdots & & & \ddots & & \vdots \\ \vdots & & & & \ddots & \vdots \\ x^{N-1}_{-(N-1)/2} & \ldots & x_0^{N-1} & \ldots & \ldots & x^{N-1}_{(N-1)/2} \end{pmatrix} \begin{pmatrix} d'_{-(N-1)/2} \\ \vdots \\ \vdots \\ d'_0 \\ \vdots \\ d'_{(N-1)/2} \end{pmatrix} = \begin{pmatrix} 1 \\ 0 \\ \vdots \\ 0 \\ \vdots \\ 0 \end{pmatrix}. \quad (19)$$

This coefficient matrix A is a so-called Vandermonde matrix, and it is known that this matrix equation can be converted to the following equation, by using the product of the differences:

$$|A| = \prod_{j>k} (x_j - x_k). \quad (20)$$

It is hence possible to determine the precise solution of $d'_i$ using the Crammer's formula. The detailed sequence of the calculation is omitted here, but by means of algebraic calculation, the following solution is obtained:

$$d'_i = \frac{\prod_k x_k}{x_i \cdot \prod_{k \neq i} (x_k - x_i)}. \quad (21)$$

Therefore, the correction coefficients $d_i$ are determined as follows:

$$d_i = \begin{cases} \dfrac{\prod_k x_k}{x_i \cdot \prod_{k \neq i} (x_k - x_i)} - 1 & (i = 0) \\[2ex] \dfrac{\prod_k x_k}{x_i \cdot \prod_{k \neq i} (x_k - x_i)} & (i \neq 0). \end{cases} \quad (22)$$

Thus, the precise solution for the density correction coefficients $d_i$ is found, from the conditions where the differential coefficients at the origin of the power spectrum become zero. As the number of nozzles N used in the correction increases, the possibility of making the higher-order differential coefficients become zero increases, and hence, the low-frequency energy becomes smaller and the visibility of non-uniformities is reduced yet further.

In the present embodiment, the conditions where the differential coefficients become zero at the origin are used, but if the differential coefficients become sufficiently small values compared to the differential coefficients before the correction (such as 1/10 of the values before the correction), rather than being set completely to zero, it is still possible to make the low-frequency components of the power spectrum of the density non-uniformity sufficiently small. In other words, from the viewpoint of achieving conditions where the low-frequency components of the power spectrum are reduced to extent by which density non-uniformities become invisible, it is acceptable that the differential coefficients of the power spectrum at the origin are set to sufficiently small values (approximately 0), and that the range of each differential coefficient after correction can be set up to 1/10 of the absolute value of the differential coefficient before correction.

The foregoing description relates to the method of determining density correction coefficients relating to one particular nozzle (e.g., the nozzle nzl3 in FIG. 1). In actual practice, all of the nozzles in the head have some degree of depositing position errors, and therefore, it is desirable that corrections are performed in respect of all of these depositing position errors.

In other words, the aforementioned density correction coefficients for the surrounding N nozzles are determined with respect to each nozzle. Since the equations for minimizing the power spectra, which are described above and used when determining the density correction coefficients, are linear, then it is possible to superpose the equations for each nozzle. Therefore, the total density correction coefficient for a nozzle is determined by finding the sum of the density correction coefficients obtained as described above.

More specifically, if the density correction coefficient for a nozzle i in relation to the positional error of a nozzle k is set to be d(i, k), then the value of this d(i, k) is determined by the solution $D_i$ of equation (13), and the total density correction coefficient $d_i$ for the nozzle i is obtained by linear combination of d(i, k) as follows:

$$d_i = \sum_k d(i, k). \quad (23)$$

In the present embodiment, d(i, k) is accumulated for the index k assuming that the depositing position errors of all of the nozzles are to be corrected, but it is also possible to adopt a composition in which a certain value ΔX_thresh is set previously as a threshold value, and correction is performed selectively by setting as objects for correction only those nozzles that have a depositing position error exceeding this threshold value of ΔX_thresh.

As stated above, the accuracy of correction is improved if the value of the number of nozzles N used for the correction is increased, but this also increases the breadth of change of the density correction coefficients and may lead to disruption of the reproduced image. Therefore, desirably, a limit range (a lower limit d_min to an upper limit d_max) is set for the correction coefficients in order to prevent the occurrence of image disruption, and the value N is set in such a manner that the total density correction coefficient determined by the above-described equation (23) comes within this limit range. In other words, the value N is set in such a manner that the relationship of d_min<$d_i$<d_max is satisfied. From experimental observation, it was revealed that image disruption does not occur provided that d_min≧−1 and d_max≦1.

Correction Technology According to Embodiments of the Present Invention

Figure 4:
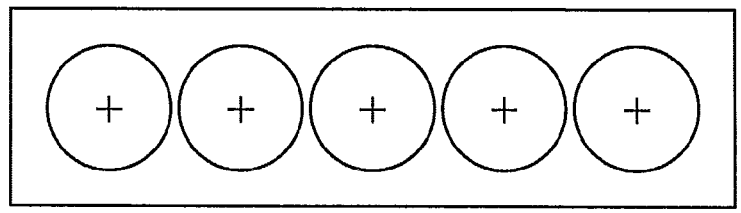
FIG. 4 is an illustrative diagram of normal correction.
Figure 4:
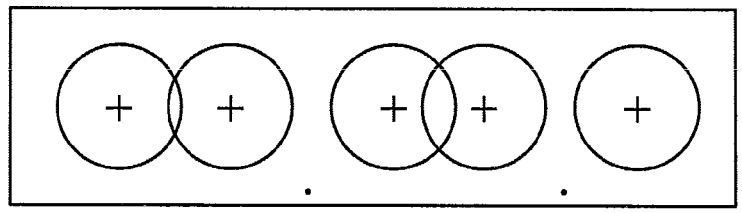
Figure 4:
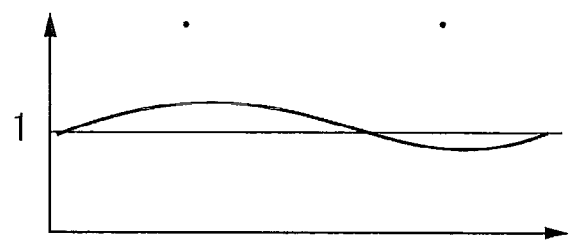

FIG. 4 shows a state of normal correction employing the correction method described in FIGS. 1 to 3. The actual droplet depositing positions have depositing position errors with respect to the standard (ideal) droplet depositing positions as shown in FIG. 4. The corrected densities calculated in this case are increased or reduced with respect to the standard values (here, the normalized standard density is taken as "1"). The corrected densities in FIG. 4 are always outputted since the amounts of increase or decrease are within the output density range of the apparatus.

Figure 5A:
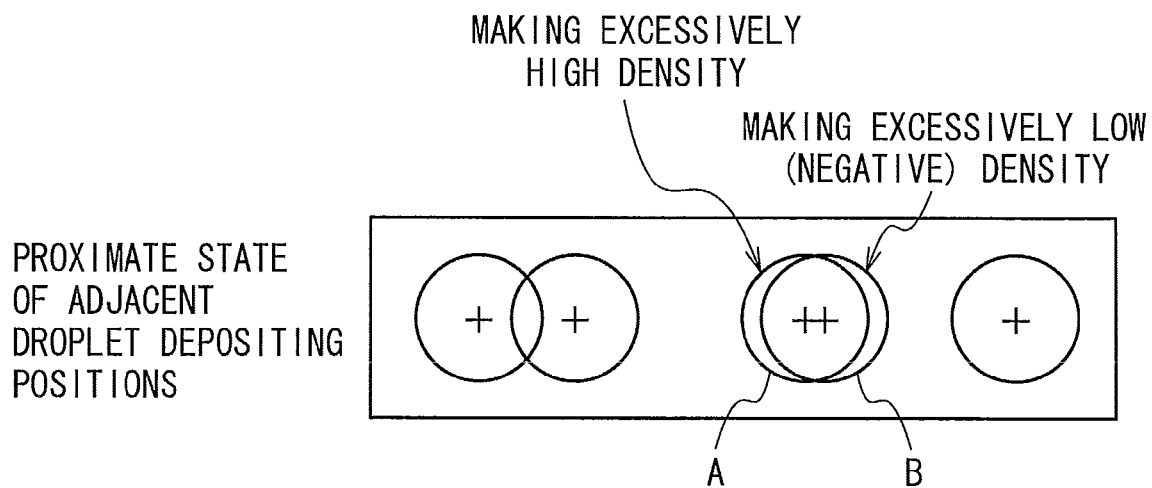
FIGS. 5A and 5B are illustrative diagrams of a case where there is large displacement of the droplet depositing positions and the correction density is out of the output image density range.
Figure 5B:
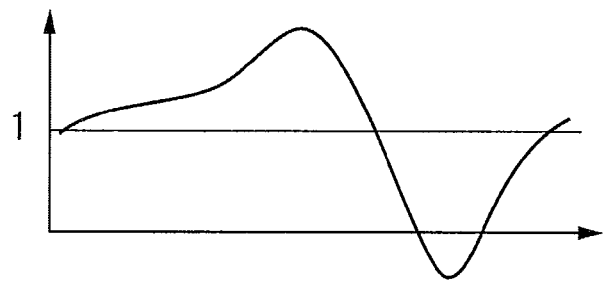

FIGS. 5A and 5B show a state where there is extremely large displacement in the droplet depositing positions. If there is excessively large depositing position error (if the depositing position becomes extremely close to an adjacent droplet depositing position) as shown in FIG. 5A, then the corrected densities calculated by the correction method in the related art are excessively large or small as shown in FIG. 5B. In other words, correction to an excessively high density (correction by a large positive value) is applied to the pixel corresponding to one of the nozzles which have extremely close mutually adjacent droplet depositing positions (namely, the nozzle that deposits a droplet to form a dot A on the left-hand side), and correction to an excessively low density (correction by a negative value) is applied to the pixel corresponding to the other nozzle (the nozzle that deposits a droplet to form a dot B on the right-hand side). Corrected densities of this kind are out of the output density range of the apparatus.

Figure 6A:
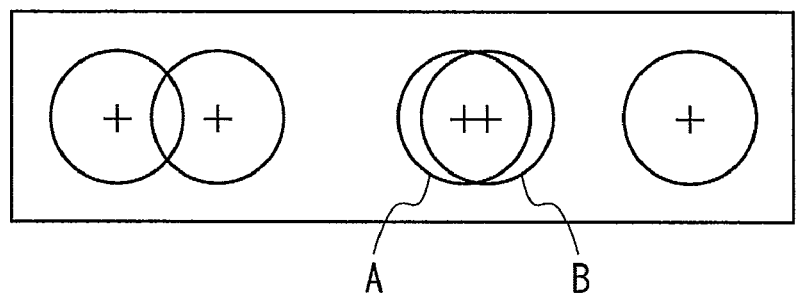
FIGS. 6A to 6C are illustrative diagrams of processing for redistributing the sum density within the output image density range, while preserving the sum density between the most adjacent droplet depositing points.
Figure 6B:
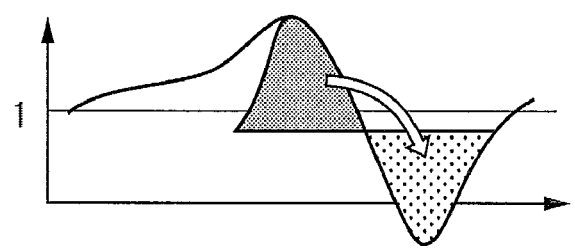
Figure 6C:
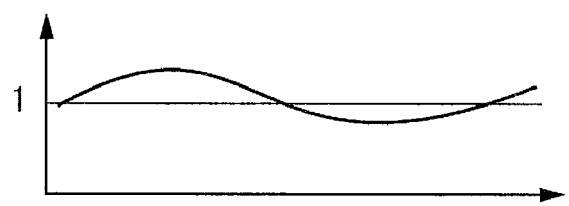

FIGS. 6A to 6C illustrate correction processing according to an embodiment of the present invention, in order to resolve the problem described with reference to FIGS. 5A and 5B. FIG. 6A shows equivalent contents to those in FIG. 5A. If the calculated corrected density has an abnormal value (a value outside the output density range) as shown in FIG. 5B, then the density of the droplet deposition (row) that has been out of the output density range and the density of the most adjacent droplet deposition (row) are summed together as shown in FIG. 6B, and this sum density is redistributed between the two droplet deposition (rows) so as to preserve the sum density.

In the processing from the state in FIG. 6B to the state in FIG. 6C, the droplet deposition that is set to excessively high density is cancelled out by adjacent droplet deposition that is set to excessively low density. In FIGS. 6B to 6C, the sum density is divided into two and redistributed to the respective rows (nozzles), and other redistribution methods can be adopted as follows, for example:

(1) the sum density is divided into two and distributed (averaged) to two rows (nozzles);

(2) the higher of the densities before summing is set to the maximum density that can be output (i.e., "the upper limit value of output image density range") and the other density is set to a value of "the sum density minus the maximum density that can be output"; and (3) the lower of the densities before summing is set to the minimum density that can be output (i.e., "the lower limit value of output image density range") and the other density is set to a value of "the sum density minus the minimum density that can be output".

By using a method of this kind, since adjacent droplet depositing points which are within a certain proximity of each other appear to be the same when viewed macroscopically, then provided that the overall sum density is not changed, there is virtually no effect on the image as viewed by the naked eye even if the densities are converted as described above. For example, if using a recording resolution of approximately 1200 dpi, correcting the image data for two mutually adjacent droplet depositing points causes the resolution to fall to 600 dpi in that portion. However, this is not a practical problem since it is not of a level that is visible to the naked eye.

Processing Sequence for Outputting Image in Inkjet Recording Apparatus

Figure 7:
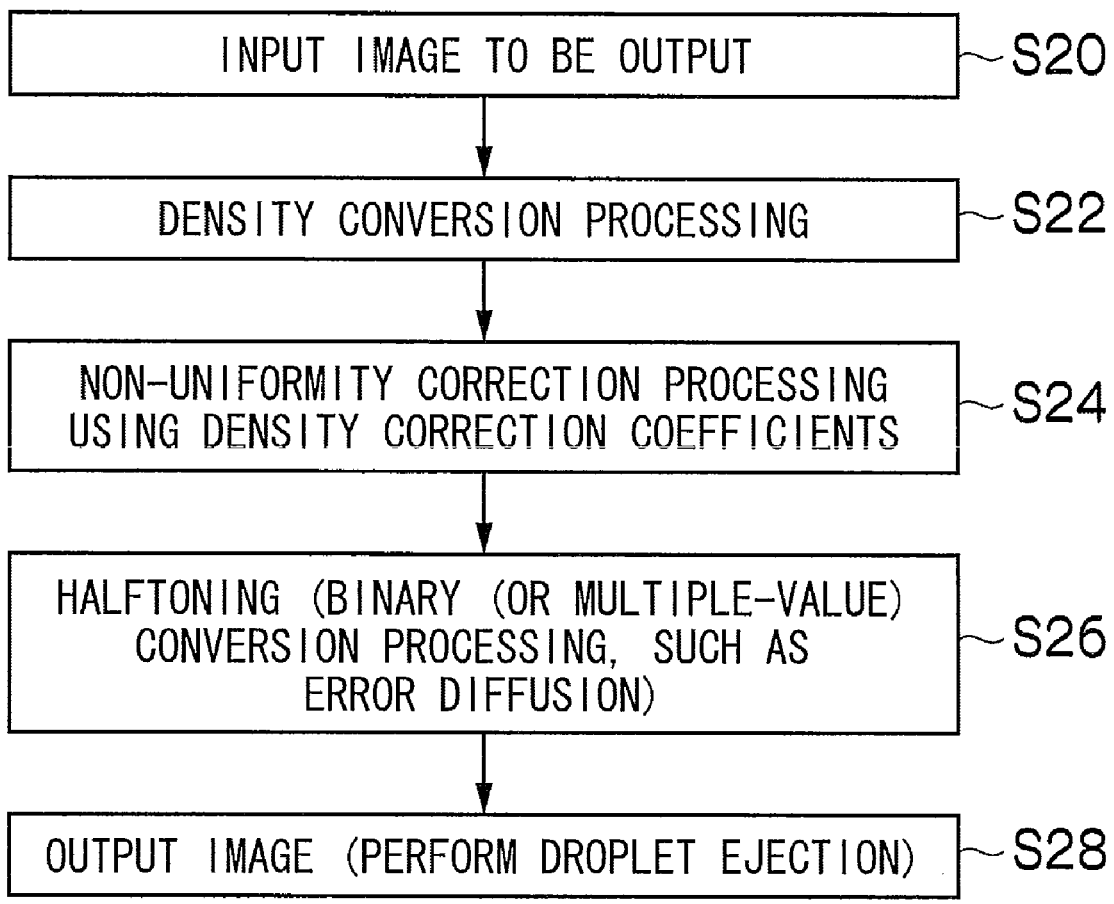
FIG. 7 shows a flowchart of a procedure for outputting an image.

FIG. 7 shows a flowchart of a procedure for outputting an image. When outputting (printing) an image, firstly the data of the image to be outputted (image to be printed) is input (step S20). There are no particular restrictions on the data format of the input image, but 24-bit color RGB data is input, for example. Density conversion processing based on a look-up table is carried out on this input image (step S22), thereby converting the input image into density data D(i,j) corresponding to the ink colors of the printers. Here, (i,j) indicates the position of a pixel, and hence the density data is assigned to respective pixels.

In this case, for the sake of explanation it is supposed that the image resolution of the input image matches the image resolution (nozzle resolution) of the printer. If the image resolution of the input image does not match the image resolution (nozzle resolution) of the printer, then pixel number conversion processing is carried out on the input image, in accordance with the resolution of the printer.

The density conversion processing in step S22 uses a general process, which includes under-color removal (UCR) processing, light ink distribution processing in the case of a system which uses light inks (light-colored inks of the same color), and so on.

For example, in the case of the printer having a three-ink composition comprising cyan (C), magenta (M) and yellow (Y), the image is converted into density data D(i, j) for each of the CMY inks. Alternatively, in the case of the printer having a system which also uses other inks, such as black (K), light cyan (LC), and light magenta (LM) in addition to the three inks of CMY, then the image is converted into density data D(i, j) for each of the inks including these additional ink colors.

Next, non-uniformity correction processing in use of density correction coefficients is carried out with respect to the density data D(i, j) obtained by the density conversion processing (step S24). Correction processing of the density data with the correction data and redistribution processing of the values being out of the output image density range are carried out, which are described later with reference to FIGS. 8A to 10C. The corrected density data D'(i,j) is thus obtained.

Thereupon, by applying a half-toning process to the corrected density data D'(i, j) (step S26 in FIG. 7), the data is converted into dot on/off signals (in binary data), or alternatively, if the dot sizes are variable, then the data is converted into multiple-value data signals including the size types (selection of dot size). There are no particular restrictions on the half-toning method used, and a commonly known binarizing (or multiple-value converting) technique, such as error diffusion, dithering, or the like, may be used.

Droplet ejection is performed by each nozzle on the basis of the binary (multiple-value) signal thus obtained, thereby outputting (recording) an image (step S28). In other words, ink ejection (droplet ejection) data for each nozzle is generated on the basis of the binary (multiple-value) data obtained by the halftoning process (step S26), and this data is used to control the ejection operation. Thereby, density non-uniformities are suppressed and images of high quality can be formed.

Processing Flow from Image Data Correction Processing to Image Output

Embodiment 1

Figure 8A:
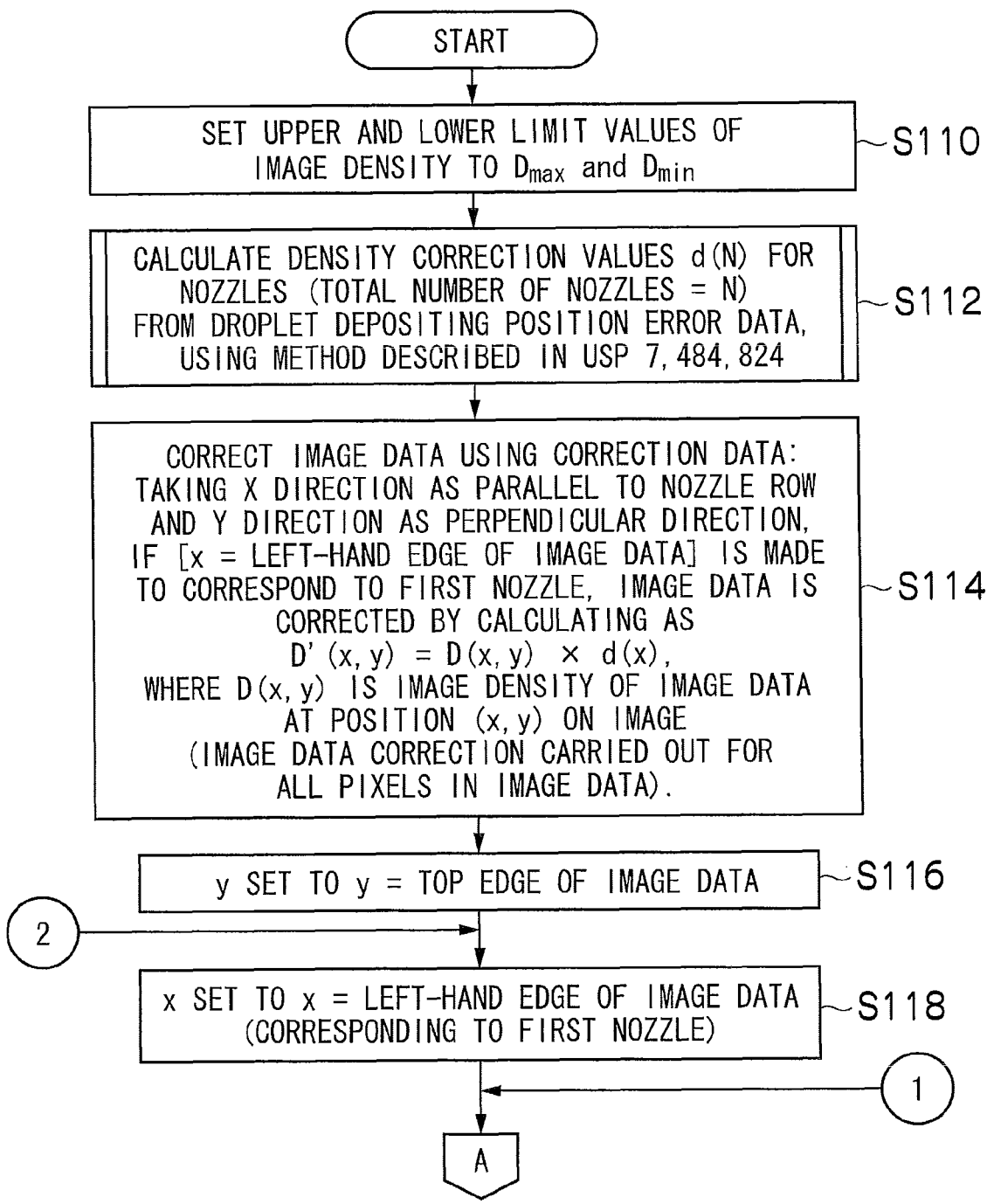
FIGS. 8A to 8C show a flowchart of a detailed processing procedure for outputting an image according to a first embodiment.
Figure 8B:
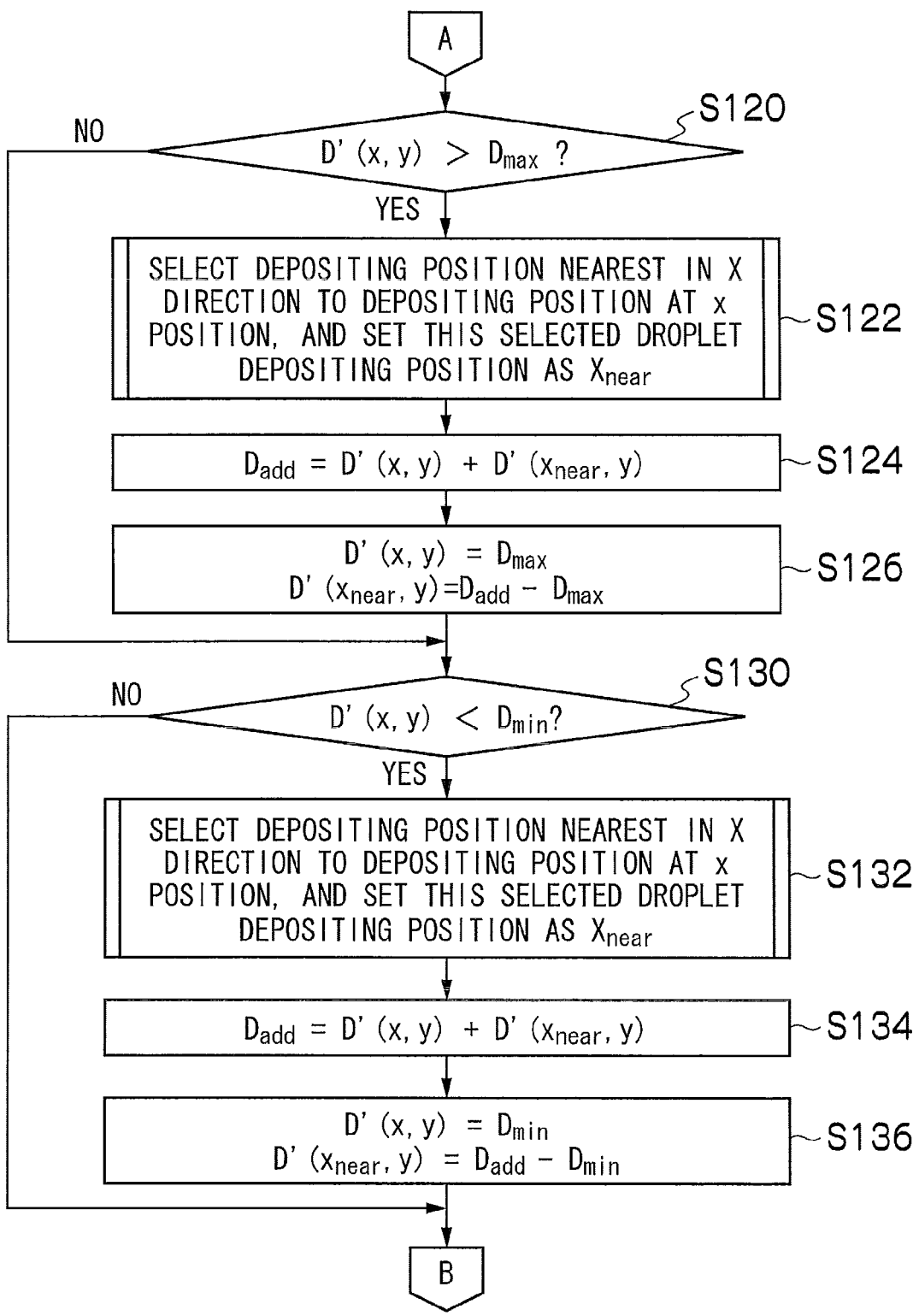
Figure 8C:
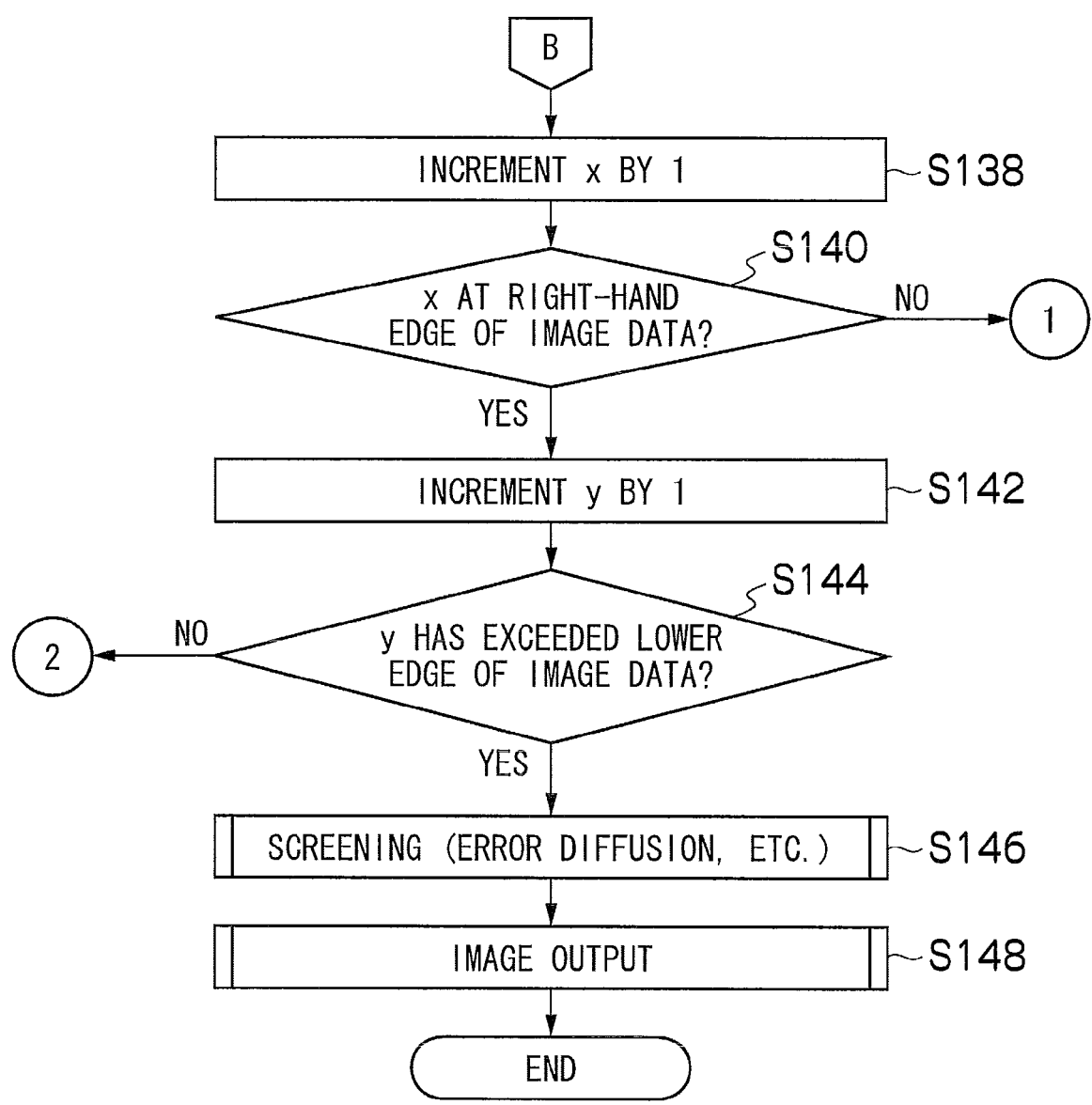

FIGS. 8A, 8B and 8C show a flowchart of a detailed processing procedure for outputting an image according to a first embodiment. When this processing is started, firstly, the upper limit value $D_{max}$ and the lower limit value $D_{min}$ of the output image density are specified and set in accordance with the capability of the recording head of the inkjet recording apparatus (step S110). Thereupon, the density correction values d(N) for the respective nozzles (total number of nozzles=N) are calculated from the droplet depositing position error data, using the method described with reference to FIGS. 1 to 3 (the method described in U.S. Pat. No. 7,484,824) (step S112).

The image data is then corrected using the correction data determined at step S112 (step S114). In other words, taking the X direction as the direction parallel to the nozzle row (the main scanning direction in a single-pass method using a page-wide full line head) and taking the Y direction as the perpendicular direction (the sub-scanning direction in the aforementioned method), if the x position at the left-hand edge of the image data is taken to correspond to the first nozzle, and the image density of the image data at position (x,y) on the image is taken as D(x,y), then the correction of the image data is calculated as follows:

$$D'(x,y)=D(x,y)\times d(x).$$

The above-described calculation is carried out in respect of all of the pixels of the image data, to obtain the corrected image data of the image density D'(x,y).

Next, a first loop counter (a y value loop counter) for changing the position of the pixel that is the object of loop calculation is set to an initial value (i.e., "y=top edge of image data") (step S116), and a second loop counter (an x value loop counter) is set to an initial value (i.e., "x=left-hand edge of image data") (step S118).

Thereupon, the procedure advances to step S120, and it is judged whether or not the corrected image density D'(x,y) is out of (i.e., higher than) the upper limit value $D_{max}$ of the image density. If the verdict is "YES", then the procedure advances to step S122 and the nearest droplet depositing position in the X direction to the droplet depositing position at the current x position is selected, and this selected droplet depositing position is taken as $x_{near}$.

In order to find the nearest droplet depositing position to the current droplet depositing position, each of the droplet depositing positions in the X direction (relative positions): px(n) are calculated in advance. For example, they are calculated as shown below from the depositing position error data for the nozzles $\Delta x(n)$ and the standard droplet depositing interval L (in the case of 1200 dpi, for instance, L=25.4 mm/1200):

$$px(n)=L\times n+\Delta x(n).$$

Next, the sum density $D_{add}$ of the image densities D'(x,y) and D'($x_{near}$,y) of the respective mutually adjacent droplet depositing positions is calculated (step S124), the corrected image density D'(x,y) for the current x position is substituted with $D_{max}$, and the corrected image density $D'(x_{near},y)$ for the $x_{near}$ position is substituted with "$D_{add}-D_{max}$" (S126). After step S126, or if a "NO" verdict is returned at step S120, the procedure advances to step S130.

At step S130, it is judged whether or not the corrected image density $D'(x,y)$ is out of (i.e., lower than) the lower limit value $D_{min}$ of the image density. If the verdict is "YES", then the procedure advances to step S132 and the nearest droplet depositing position in the X direction to the droplet depositing position at the x position in question is selected, and this selected droplet depositing position is taken as $x_{near}$.

Next, the sum density $D_{add}$ of the image densities $D'(x,y)$ and $D'(x_{near},y)$ of the respective mutually adjacent droplet depositing positions is calculated (step S134), the corrected image density $D'(x,y)$ for the current x position is substituted with $D_{min}$, and the corrected image density $D'(x_{near},y)$ for the $x_{near}$ position is substituted with "$D_{add}-D_{min}$" (step S136). After step S136, or if a "NO" verdict is returned at step S130, the procedure advances to step S138 and the loop counter of the x value is incremented by 1.

It is then judged whether or not the x value of the loop counter has reached a value corresponding to the right-hand edge of the image data (step S140), and if it has not reached the right-hand edge (in the case of a "NO" verdict), then the procedure returns to step S120 and the processing described above (steps S120 to S140) are repeated.

If a YES verdict is obtained at step S140, then the loop counter of the y value is incremented by 1 (step S142), and it is judged whether or not the y value of the loop counter has passed the lower edge of the image data (step S144).

If the judgment at step S144 returns a "NO" verdict, then the procedure returns to step S118, and the processing described above (steps S118 to S144) are repeated. If the processing has been completed for all of the pixels of the image data, then a "YES" verdict is obtained in the judgment at step S144 and the routine exits from the correction calculation loop and advances to step S146.

At step S146, the image data that has undergone the correction processing as described above is subjected to a screening process using error diffusion, dithering, or the like, to convert the data into binary or multiple-value dot arrangement data.

Thus, the ink ejection (droplet ejection) from the respective nozzles is controlled on the basis of the obtained dot arrangement data, and an image is formed accordingly (step S148).

Figure 9:
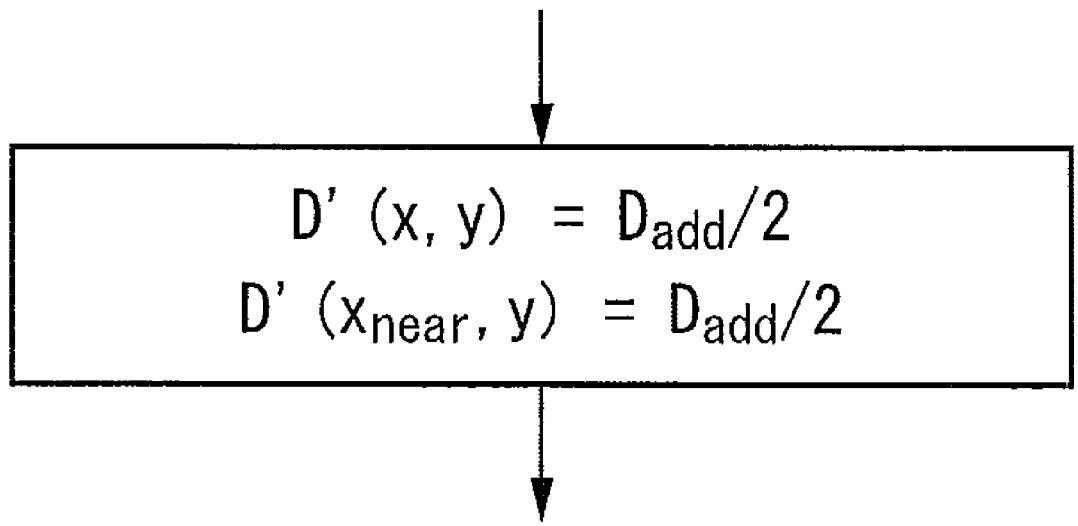
FIG. 9 is a step block diagram showing another example of processing of the step of distributing the sum density.

It is possible to replace each of the steps S126 and S136 with the step shown in FIG. 9. More specifically, the step shown in FIG. 9 finds the average of the sum of the corrected image densities for adjacent droplet depositing positions.

The sequence (order) of the processing block of steps S120 to S126 and the processing block of steps S130 to S136 may be reversed.

By means of the processing described above, it is possible to accurately correct for banding caused by depositing position errors between the respective nozzles, and therefore an image of high quality can be formed.

Processing Flow from Image Data Correction Processing to Image Output

Embodiment 2

Figure 10A:
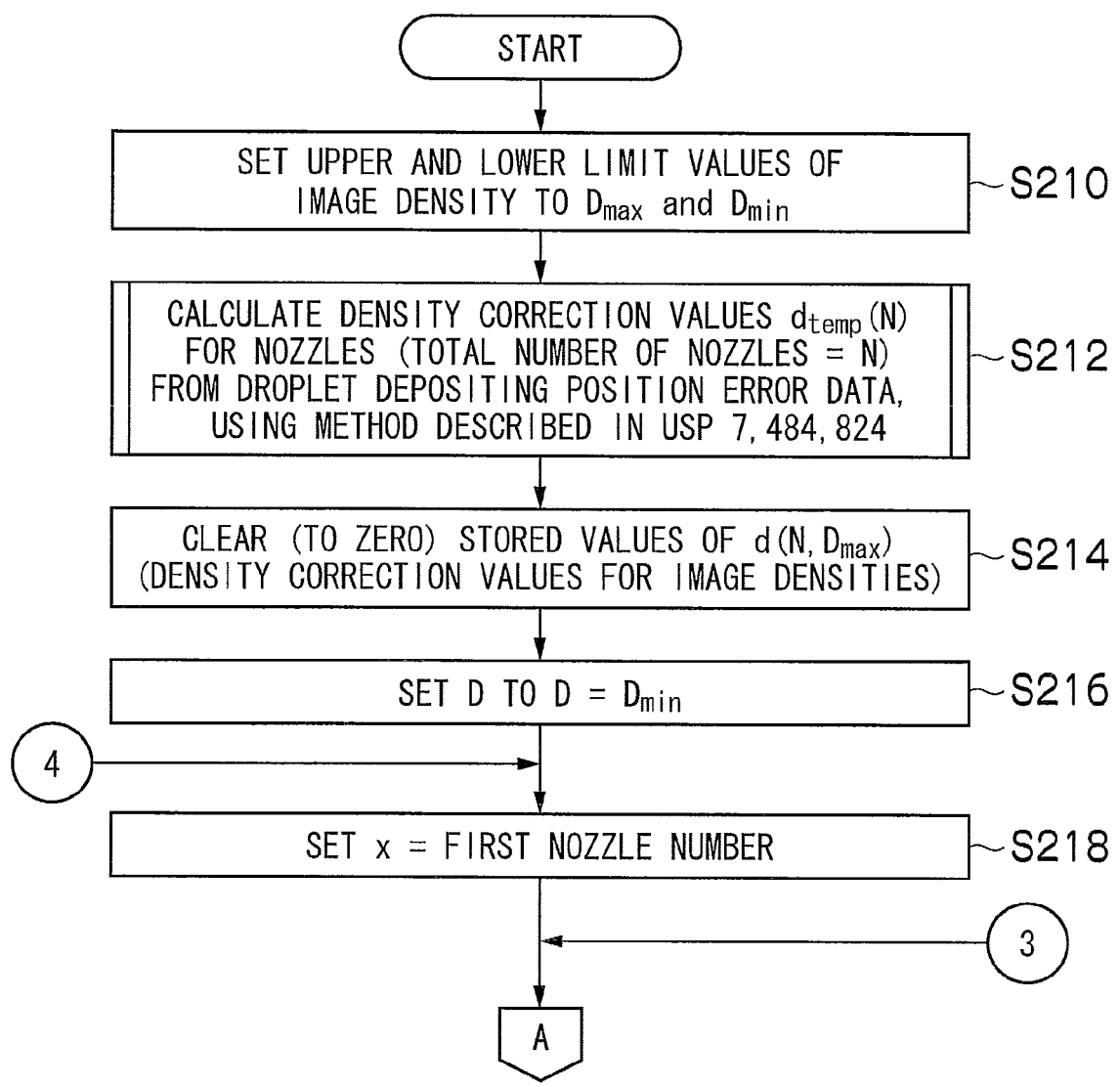
FIGS. 10A to 10C show a flowchart of a detailed processing procedure for outputting an image according to a second embodiment.
Figure 10B:
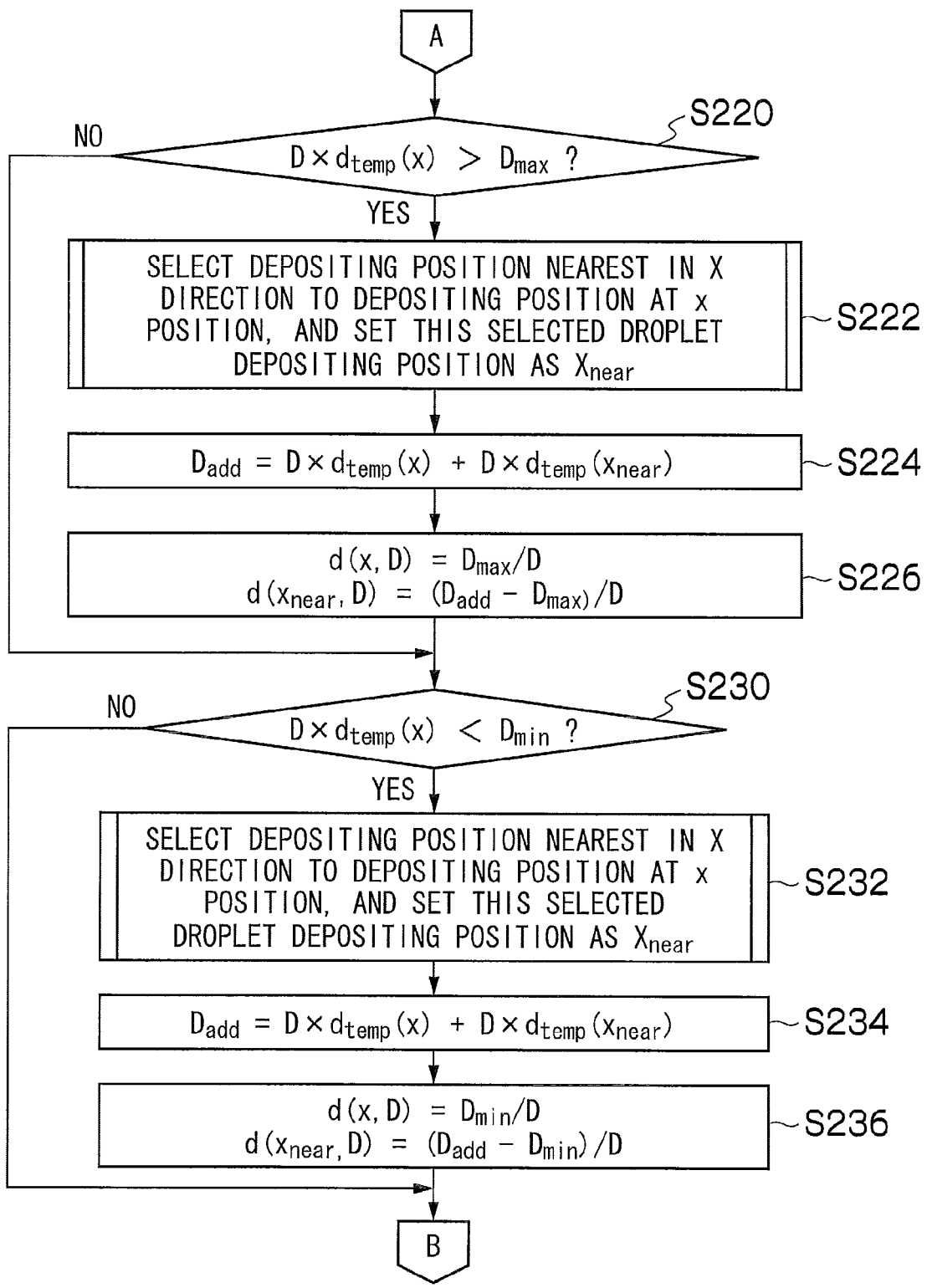
Figure 10C:
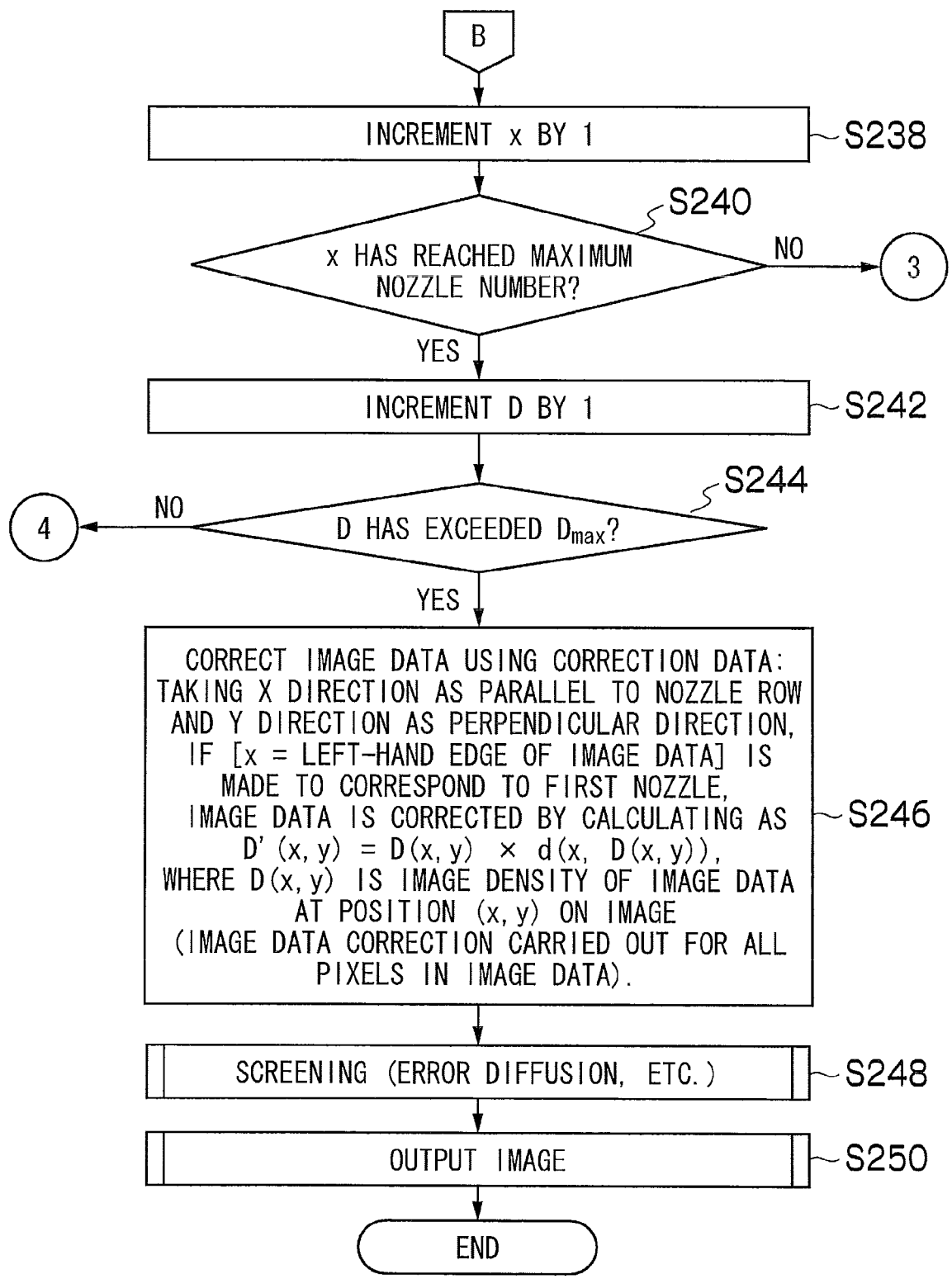

FIGS. 10A, 10B and 10C show a flowchart of a detailed processing procedure for outputting an image according to a second embodiment. When this processing is started, firstly, the upper limit value of the image density is set as $D_{max}$ and the lower limit value of the image density is set as $D_{min}$ (step S210). Thereupon, density correction values $d_{temp}(N)$ for the respective nozzles (total number of nozzles=N) are calculated from the droplet depositing position error data, using the correction method described in U.S. Pat. No. 7,484,824 (step S212).

The stored density correction values $d(N,D_{max})$ for the respective image densities are then cleared (to 0) (step S214). Then, the calculation variable parameter D is set to "$D_{min}$" (step S216), and the first nozzle number is set in the x value loop counter (step S218).

Next, it is judged whether or not the density correction value "$D \times d_{temp}(x)$" that has been corrected using the density correction value $d_{temp}(x)$ is out of (i.e., higher than) the upper limit value $D_{max}$ (step S220). If the verdict is "YES", then the procedure advances to step S222 and the nearest droplet depositing position in the X direction to the droplet depositing position at the current x position is selected, and this selected droplet depositing position is taken as $x_{near}$. The method of setting "$x_{near}$" is as described in step S122 in FIG. 8B.

Thereupon, the sum density $D_{add}$ of the corrected densities "$D \times d_{temp}(x)$" and "$D \times d_{temp}(x_{near})$" is calculated in respect of these mutually adjacent droplet depositing positions (step S224). The density correction value $d(x,D)$ for the current x position is found by "$D_{max}/D$" and stored accordingly, and the corrected density value $d(x_{near},D)$ for the $x_{near}$ position is found by "$(D_{add}-D_{max})/D$" (step S226).

In summary, the density correction value for the current x position is limited to a value whereby the corrected value becomes the maximum output density $D_{max}$, and the density correction value for the $x_{near}$ position is corrected to a value of "$D_{add}-D_{max}$" so as to preserve the overall density of the two droplet depositing positions.

After step S226, or if a "NO" verdict is returned at step S220, the procedure advances to step S230.

At step S230, it is judged whether or not the corrected density "$D \times d_{temp}(x)$" that has been corrected using the density correction value $d_{temp}(x)$ is out of (i.e., lower than) the lower limit value $D_{min}$ (step S230). If the verdict is "YES", then the procedure advances to step S232 and the nearest droplet depositing position in the X direction to the droplet depositing position at the current x position is selected, and this selected droplet depositing position is taken as $x_{near}$.

Thereupon, the sum density $D_{add}$ of the corrected densities "$D \times d_{temp}(x)$" and "$D \times d_{temp}(x_{near})$" is calculated for these mutually adjacent droplet depositing positions (step S234), and the density correction value $d(x,D)$ for the current x position is found by "$D_{max}/D$", while the density correction value $d(x_{near},D)$ for the $x_{near}$ position is found by "$(D_{add}-D_{max})/D$", these density correction values being stored respectively (step S236). After step S236, or if a "NO" verdict is returned at step S230, the procedure advances to step S238 and the loop counter of the x value is incremented by 1.

It is judged whether or not the x value of the loop counter has reached the maximum nozzle number (step S240), and if the verdict is "NO", then the procedure returns to step S220, and the processing described above (steps S220 to S240) is repeated.

On the other hand, if the maximum nozzle number has been reached at step S240, then a "YES" verdict is obtained, and in this case, the D value loop counter is incremented by 1 (step S242), and it is judged whether or not the D value of the loop counter has exceeded $D_{max}$ (step S244).

If the judgment at step S244 returns a "NO" verdict, then the procedure returns to step S218, and the processing described above (steps S218 to S244) are repeated. The calculation described above is carried out for the whole density range ($D_{min}$ to $D_{max}$), and when the density correction values have been determined for all of the image densities, then a "YES" verdict is obtained at step S244 and the routine exits from the density correction value calculation loop and proceeds to step S246.

At step S246, the image data is then corrected using the correction data determined as described above (step S246). In other words, taking the X direction as the direction parallel to the nozzle row (the main scanning direction in this printing system) and taking the Y direction as the perpendicular direction (the sub-scanning direction in this printing system), if the x position at the left-hand edge of the image data is taken to correspond to the first nozzle and the image density of the image data at position (x,y) on the image is taken as D(x,y), then the correction of the image data is calculated as follows:

$$D'(x,y)=D(x,y) \times d(x,D(x,y)).$$

The above-described calculation is carried out in respect of all of the pixels of the image data, to obtain the corrected image data of the image density D'(x,y).

The image data that has undergone the correction processing as described above is then subjected to a screening process using error diffusion, dithering, or the like, to convert the data into binary or multiple-value dot arrangement data (step S248).

Thus, the ink injection (droplet ejection) from the respective nozzles is controlled on the basis of the obtained dot arrangement data, and an image is formed accordingly (step S250).

It is also possible to replace each of the steps S226 and S236 with the step described in FIG. 9. Furthermore, the sequence (order) of the processing block of steps S220 to S226 and the processing block of steps S230 to S236 may be reversed.

By means of the processing described above, it is possible to accurately correct for banding caused by depositing position errors between the respective nozzles, and therefore an image of high quality can be formed.

Timing of Calculating (Updating) Density Correction Coefficients

The density correction coefficients described with reference to FIGS. 1 to 3 do not have to be calculated each time an image is output, but rather it is sufficient to calculate them only when the ejection characteristics of the head have changed. Consequently, processing for calculating (updating) the density correction coefficients is started under the following conditions, for example, apart from the time of manufacture (shipment) of the apparatus.

Namely, the processing is performed under any of conditions of: (a) an automatic checking device (sensor), which monitors the print result, judges that a non-uniformity streak has occurred in the printed image; (b) a human observer judges that a non-uniformity streak has occurred in the printed image upon looking at the printed image, and performs a prescribed operation (such as inputting a command to start the updating process); and (c) a previously established update timing has been reached (the update timing can be set and judged by means of time management based on a timer, or the like, or operational record management based on a print counter).

When calculating the density correction coefficients, firstly, a test pattern (a previously determined print pattern) for ascertaining the ejection characteristics of the head is printed.

Thereupon, the deposition error data, in other words, the depositing positions of the actual deposited dots formed by the droplets ejected from the nozzles, are measured from the print results of the test pattern.

For this measurement of the deposition error data, it is possible to use an image reading device using an image sensor (imaging element) (including a signal processing device for processing the captured image signal). The depositing positions of the actual deposited droplets are measured from the image data thus read in, and information on the depositing position error is obtained on the basis of the difference with respect to the ideal depositing positions (i.e., ideal depositing positions at which the ejected droplets are intended to be deposited in the case where there are no ejection abnormalities or the like). Furthermore, the optical density information for the deposited droplets is also measured, in addition to the depositing position information. An expression "depositing error data" is used to describe holistically various information (for example, actual depositing position information, depositing position error information, and optical density information) that can be obtained from the test pattern reading.

Next, the density correction coefficients are calculated using the depositing error data obtained as described above. The method of calculating the density correction coefficients is as described previously. The information relating to the density correction coefficients thus derived is stored in a rewriteable storage device, such as an EEPROM, and subsequently, the most recent correction coefficients are used.

Composition of Inkjet Recording Apparatus

Next, an inkjet recording apparatus is described which forms an image recording apparatus according to an embodiment of the present invention. The inkjet recording apparatus has the density non-uniformity correction function described above.

Figure 11:
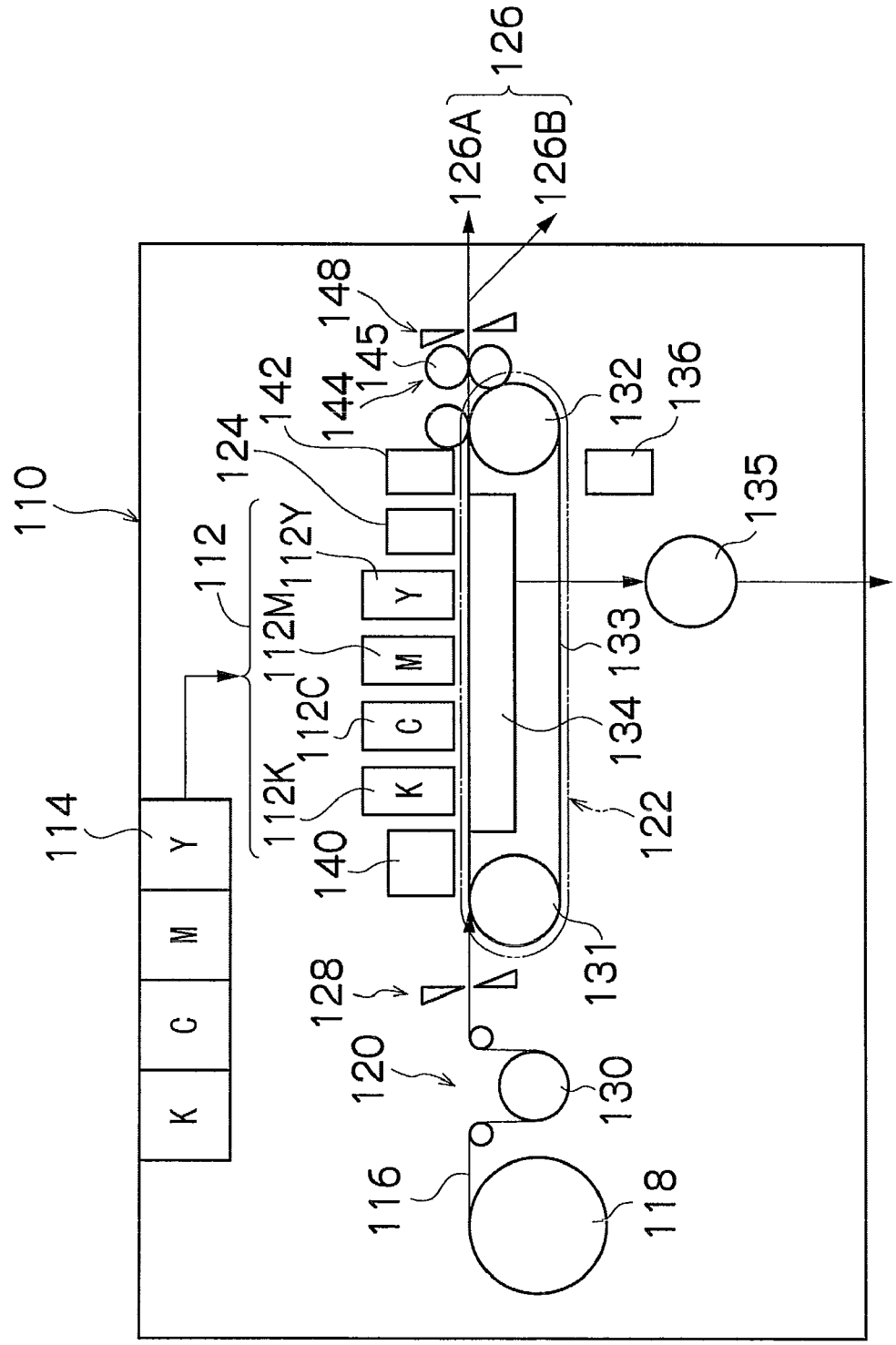
FIG. 11 is a general schematic drawing of an inkjet recording apparatus according to an embodiment of the present invention.

FIG. 11 is a general schematic drawing of an inkjet recording apparatus 110, which forms one embodiment of an image recording apparatus according to the present invention. As shown in FIG. 11, the inkjet recording apparatus 110 comprises: a print unit 112 having a plurality of ink et recording heads (hereinafter referred to as heads) 112K, 112C, 112M, and 112Y provided for ink colors of black (K), cyan (C), magenta (M), and yellow (Y), respectively; an ink storing and loading unit 114 for storing inks to be supplied to the heads 112K, 112C, 112M and 112Y; a paper supply unit 118 for supplying recording paper 116 forming a recording medium; a decurling unit 120 for removing curl in the recording paper 116; a belt conveyance unit 122, disposed facing the nozzle face (ink ejection face) of the print unit 112, for conveying the recording paper 116 while keeping the recording paper 116 flat; a print determination unit 124 for reading the printed result produced by the print unit 112; and a paper output unit 126 for outputting the recorded recording paper (printed matter) to the exterior.

The ink storing and loading unit 114 has ink tanks for storing the inks of K, C, M and Y to be supplied to the heads 112K, 112C, 112M, and 112Y, and the tanks are connected to the heads 112K, 112C, 112M, and 112Y by means of prescribed channels. The ink storing and loading unit 114 has a warning device (for example, a display device or an alarm sound generator) for warning when the remaining amount of any ink is low, and has a mechanism for preventing loading errors among the colors.

In FIG. 11, a magazine for rolled paper (continuous paper) is shown as an embodiment of the paper supply unit 118; however, more magazines with paper differences such as paper width and quality may be jointly provided. Moreover, papers may be supplied with cassettes that contain cut papers loaded in layers and that are used jointly or in lieu of the magazine for rolled paper.

In the case of a configuration in which a plurality of types of recording media can be used, it is preferable that an information recording medium such as a bar code and a wireless tag containing information about the type of recording medium is attached to the magazine, and by reading the information contained in the information recording medium with a predetermined reading device, the type of recording medium to be used is automatically determined, and ink-droplet ejection is controlled so that the ink-droplets are ejected in an appropriate manner in accordance with the type of medium.

The recording paper 116 delivered from the paper supply unit 118 retains curl due to having been loaded in the magazine. In order to remove the curl, heat is applied to the recording paper 116 in the decurling unit 120 by a heating drum 130 in the direction opposite from the curl direction in the magazine. The heating temperature at this time is preferably controlled so that the recording paper 116 has a curl in which the surface on which the print is to be made is slightly round outward.

In the case of the configuration in which roll paper is used, a cutter (first cutter) 128 is provided as shown in FIG. 11, and the continuous paper is cut into a desired size by the cutter 128. When cut papers are used, the cutter 128 is not required.

The decurled and cut recording paper 116 is delivered to the belt conveyance unit 122. The belt conveyance unit 122 has a configuration in which an endless belt 133 is set around rollers 131 and 132 so that the portion of the endless belt 133 facing at least the nozzle face of the print unit 112 and the sensor face of the print determination unit 124 forms a horizontal plane (flat plane).

The belt 133 has a width that is greater than the width of the recording paper 116, and a plurality of suction apertures (not shown) are formed on the belt surface. A suction chamber 134 is disposed in a position facing the sensor surface of the print determination unit 124 and the nozzle surface of the print unit 112 on the interior side of the belt 133, which is set around the rollers 131 and 132, as shown in FIG. 11. The suction chamber 134 provides suction with a fan 135 to generate a negative pressure, and the recording paper 116 is held on the belt 133 by suction. In place of the suction system, an electrostatic attraction system can be employed.

The belt 133 is driven in the clockwise direction in FIG. 11 by the motive force of a motor 188 (shown in FIG. 16) being transmitted to at least one of the rollers 131 and 132, which the belt 133 is set around, and the recording paper 116 held on the belt 133 is conveyed from left to right in FIG. 11.

Since ink adheres to the belt 133 when a marginless print job or the like is performed, a belt-cleaning unit 136 is disposed in a predetermined position (a suitable position outside the printing area) on the exterior side of the belt 133. Although the details of the configuration of the belt-cleaning unit 136 are not shown, embodiments thereof include a configuration in which the belt is nipped with cleaning rollers such as a brush roller and a water absorbent roller, an air blow configuration in which clean air is blown onto the belt 133, or a combination of these. In the case of the configuration in which the belt 133 is nipped with the cleaning rollers, it is preferable to make the line velocity of the cleaning rollers different than that of the belt 133 to improve the cleaning effect.

The inkjet recording apparatus may comprise a roller nip conveyance mechanism, instead of the belt conveyance unit 122. However, there is a drawback in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is preferable.

A heating fan 140 is disposed on the upstream side of the print unit 112 in the conveyance pathway formed by the belt conveyance unit 122. The heating fan 140 blows heated air onto the recording paper 116 to heat the recording paper 116 immediately before printing so that the ink deposited on the recording paper 116 dries more easily.

Figure 12:
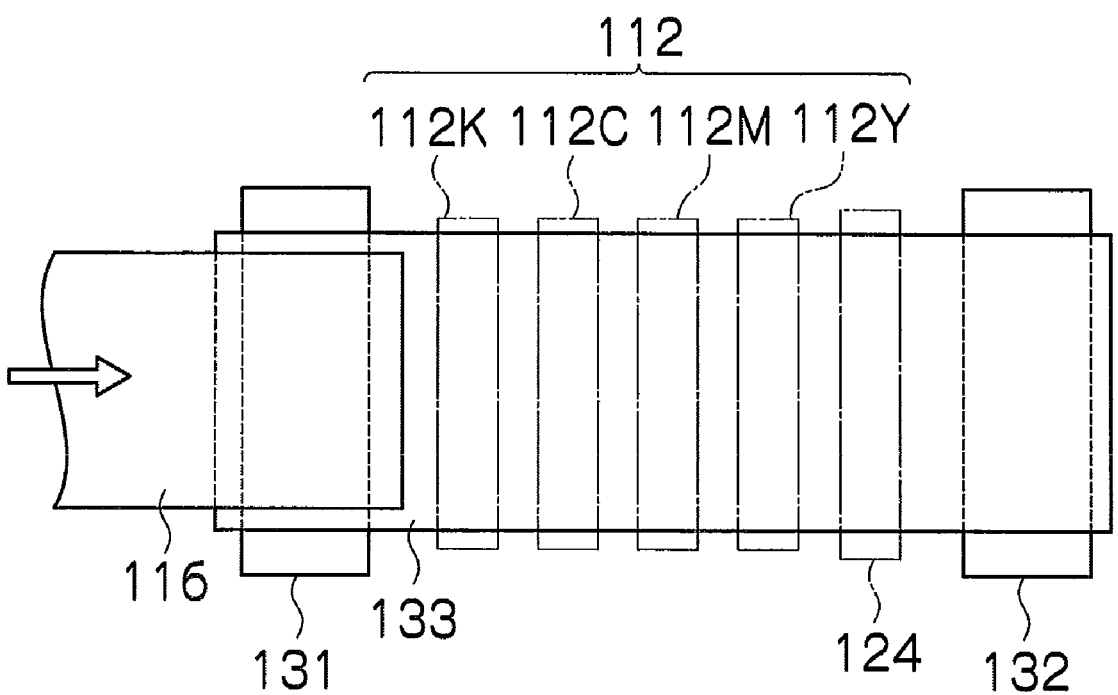
FIG. 12 is a principal plan diagram of the peripheral area of a print unit in the inkjet recording apparatus shown in FIG. 11.

The heads 112K, 112C, 112M and 112Y of the print unit 112 are full line heads having a length corresponding to the maximum width of the recording paper 116 used with the inkjet recording apparatus 110, and comprising a plurality of nozzles for ejecting ink arranged on a nozzle face through a length exceeding at least one edge of the maximum-size recording medium (namely, the full width of the printable range) (see FIG. 12).

The print heads 112K, 112C, 112M and 112Y are arranged in this color order (black (K), cyan (C), magenta (M), yellow (Y)) from the upstream side in the feed direction of the recording paper 116, and these heads 112K, 112C, 112M and 112Y are fixed extending in a direction substantially perpendicular to the conveyance direction of the recording paper 116.

A color image can be formed on the recording paper 116 by ejecting inks of different colors from the heads 112K, 112C, 112M and 112Y, respectively, onto the recording paper 116 while the recording paper 116 is conveyed by the belt conveyance unit 122.

By adopting a configuration in which the full line heads 112K, 112C, 112M and 112Y having nozzle rows covering the full paper width are provided for the respective colors in this way, it is possible to record an image on the full surface of the recording paper 116 by performing just one operation of relatively moving the recording paper 116 and the print unit 112 in the paper conveyance direction (the sub-scanning direction), in other words, by means of a single sub-scanning action. Higher-speed printing is thereby made possible and productivity can be improved in comparison with a shuttle type head configuration in which a recording head reciprocates in the main scanning direction.

Although the configuration with the KCMY four standard colors is described in the present embodiment, combinations of the ink colors and the number of colors are not limited to those. Light inks, dark inks or special color inks can be added as required. For example, a configuration is possible in which inkjet heads for ejecting light-colored inks such as light cyan and light magenta are added. Furthermore, there are no particular restrictions of the sequence in which the heads of respective colors are arranged.

The print determination unit 124 shown in FIG. 11 has an image sensor (line sensor or area sensor) for capturing an image of the droplet ejection result of the print unit 112, and functions as a device to check the ejection characteristics, such as blockages, depositing position error, and the like, of the nozzles, on the basis of the image of ejected droplets read in by the image sensor. A test pattern or the target image printed by the print heads 112K, 112C, 112M, and 112Y of the respective colors is read in by the print determination unit 124, and the ejection performed by each head is determined. The ejection determination includes the presence of the ejection, measurement of the dot size, and measurement of the dot depositing position.

A post-drying unit 142 is disposed following the print determination unit 124. The post-drying unit 142 is a device to dry the printed image surface, and includes a heating fan, for example. It is preferable to avoid contact with the printed surface until the printed ink dries, and a device that blows heated air onto the printed surface is preferable.

In cases in which printing is performed with dye-based ink on porous paper, blocking the pores of the paper by the application of pressure prevents the ink from coming contact with ozone and other substance that cause dye molecules to break down, and has the effect of increasing the durability of the print.

A heating/pressurizing unit 144 is disposed following the post-drying unit 142. The heating/pressurizing unit 144 is a device to control the glossiness of the image surface, and the image surface is pressed with a pressure roller 145 having a predetermined uneven surface shape while the image surface is heated, and the uneven shape is transferred to the image surface.

The printed matter generated in this manner is outputted from the paper output unit 126. The target print (i.e., the result of printing the target image) and the test print are preferably outputted separately. In the inkjet recording apparatus 110, a sorting device (not shown) is provided for switching the outputting pathways in order to sort the printed matter with the target print and the printed matter with the test print, and to send them to paper output units 126A and 126B, respectively. When the target print and the test print are simultaneously formed in parallel on the same large sheet of paper, the test print portion is cut and separated by a cutter (second cutter) 148. Although not shown in FIG. 11, the paper output unit 126A for the target prints is provided with a sorter for collecting prints according to print orders.

Structure of Head

Next, the structure of the head is described. The heads 112K, 112C, 112M and 112Y of the respective ink colors have the same structure, and a reference numeral 150 is hereinafter designated to any of the heads.

Figure 13A:
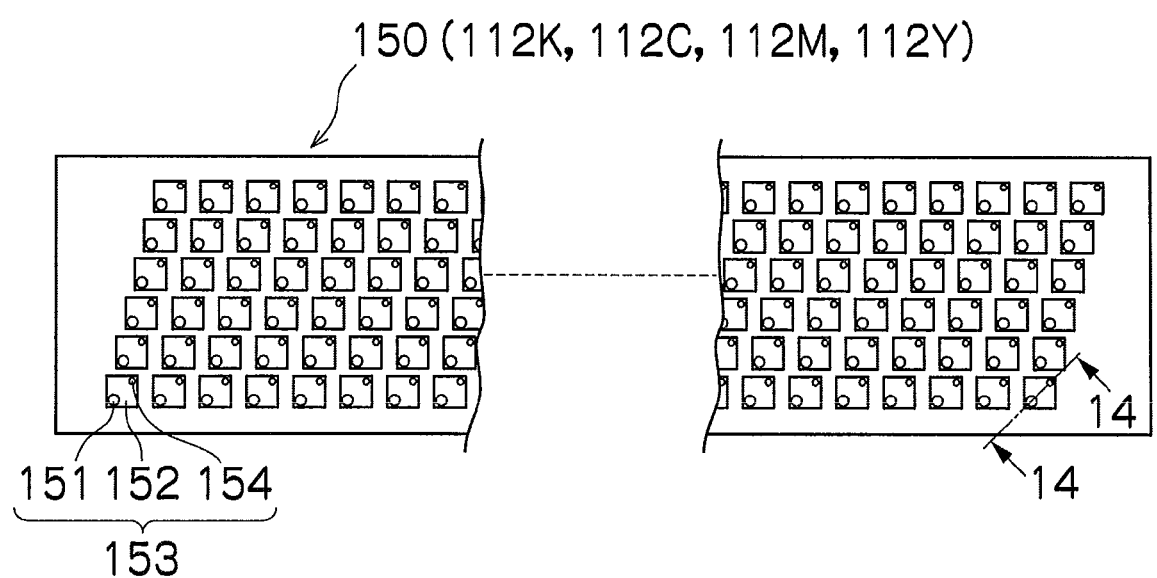
FIG. 13A is a plan view perspective diagram showing a compositional example of a print head.
Figure 13B:
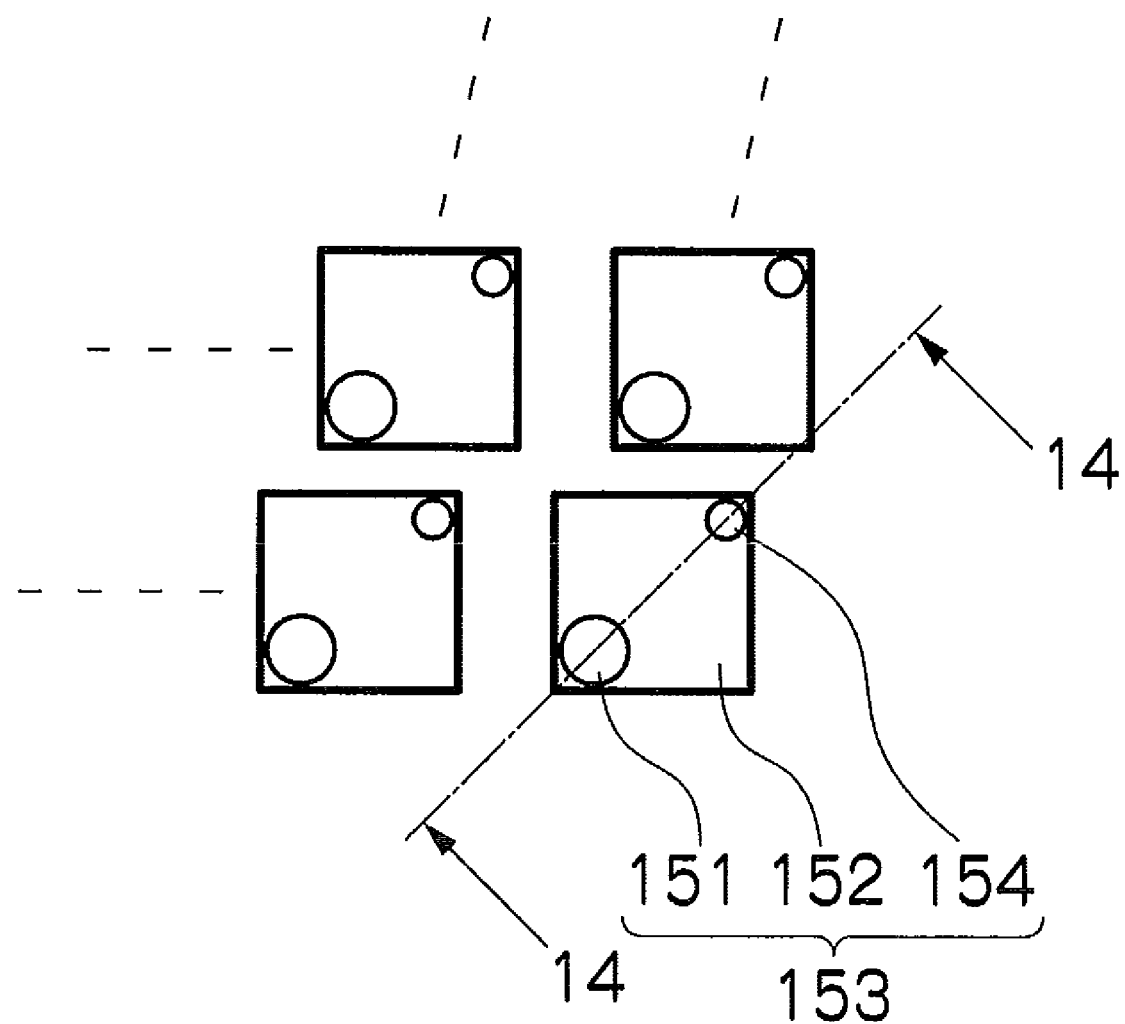
FIG. 13B is a principal enlarged view of FIG. 13A.
Figure 14:
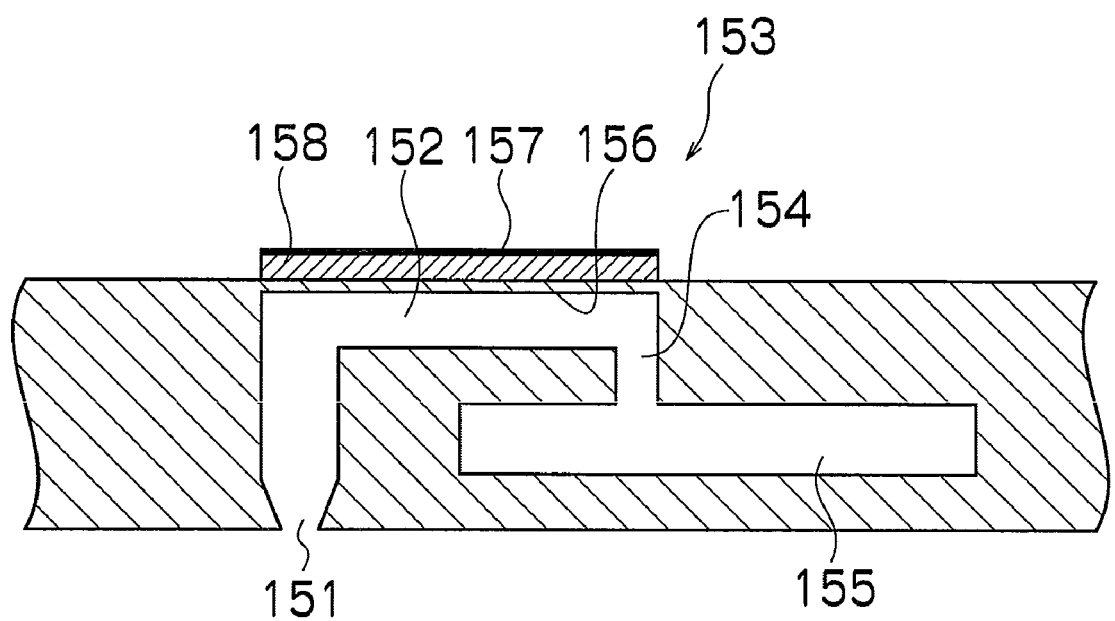
FIG. 14 is a cross-sectional view along line 14-14 in FIGS. 13A and 13B.

FIG. 13A is a perspective plan view showing an embodiment of the configuration of the head 150, FIG. 13B is an enlarged view of a portion thereof, FIG. 13C is a perspective plan view showing another embodiment of the configuration of the head 150, and FIG. 14 is a cross-sectional view taken along the line 14-14 in FIGS. 13A and 13B, showing the inner structure of a droplet ejection element (an ink chamber unit for one nozzle 151) for one channel constituting a recording element unit.

The nozzle pitch in the head 150 should be minimized in order to maximize the resolution of the dots printed on the surface of the recording paper 116. As shown in FIGS. 13A and 13B, the head 150 according to the present embodiment has a structure in which a plurality of ink chamber units (droplet ejection elements) 153, each comprising a nozzle 151 forming an ink ejection port, a pressure chamber 152 corresponding to the nozzle 151, and the like, are disposed two-dimensionally in the form of a staggered matrix, and hence the effective nozzle interval (the projected nozzle pitch) as projected (orthogonal projection) in the lengthwise direction of the head (the direction perpendicular to the paper conveyance direction) is reduced and high nozzle density is achieved.

The mode of forming one or more nozzle rows through a length corresponding to the entire width of the recording paper 116 in a direction substantially perpendicular to the conveyance direction of the recording paper 116 is not limited to the embodiment described above. For example, instead of the configuration in FIG. 13A, as shown in FIG. 13C, a line head having nozzle rows of a length corresponding to the entire width of the recording paper 116 can be formed by arranging and combining, in a staggered matrix, short head modules 150' each having a plurality of nozzles 151 arrayed in a two-dimensional fashion.

As shown in FIGS. 13A and 13B, the planar shape of the pressure chamber 152 provided corresponding to each nozzle 151 is substantially a square shape, and an outlet port to the nozzle 151 is provided at one of the ends of the diagonal line of the planar shape, while an inlet port (supply port) 154 for supplying ink is provided at the other end thereof. The shape of the pressure chamber 152 is not limited to that of the present embodiment and various modes are possible in which the planar shape is a quadrilateral shape (rhombic shape, rectangular shape, or the like), a pentagonal shape, a hexagonal shape, or other polygonal shape, or a circular shape, elliptical shape, or the like.

As shown in FIG. 14, each pressure chamber 152 is connected to a common channel 155 through the supply port 154. The common channel 155 is connected to an ink tank (not shown), which is a base tank that supplies ink, and the ink supplied from the ink tank is delivered through the common flow channel 155 to the pressure chambers 152.

An actuator 158 provided with an individual electrode 157 is bonded to a pressure plate (a diaphragm that also serves as a common electrode) 156 which forms the surface of one portion (in FIG. 14, the ceiling) of the pressure chambers 152. When a drive voltage is applied to the individual electrode 157 and the common electrode, the actuator 158 deforms, thereby changing the volume of the pressure chamber 152. This causes a pressure change which results in ink being ejected from the nozzle 151. For the actuator 158, it is possible to adopt a piezoelectric element using a piezoelectric body, such as lead zirconate titanate, barium titanate, or the like. When the actuator 158 returns to its original position after ejecting ink by the displacement, the pressure chamber 152 is replenished with new ink from the common flow channel 155, through the supply port 154.

Figure 15:
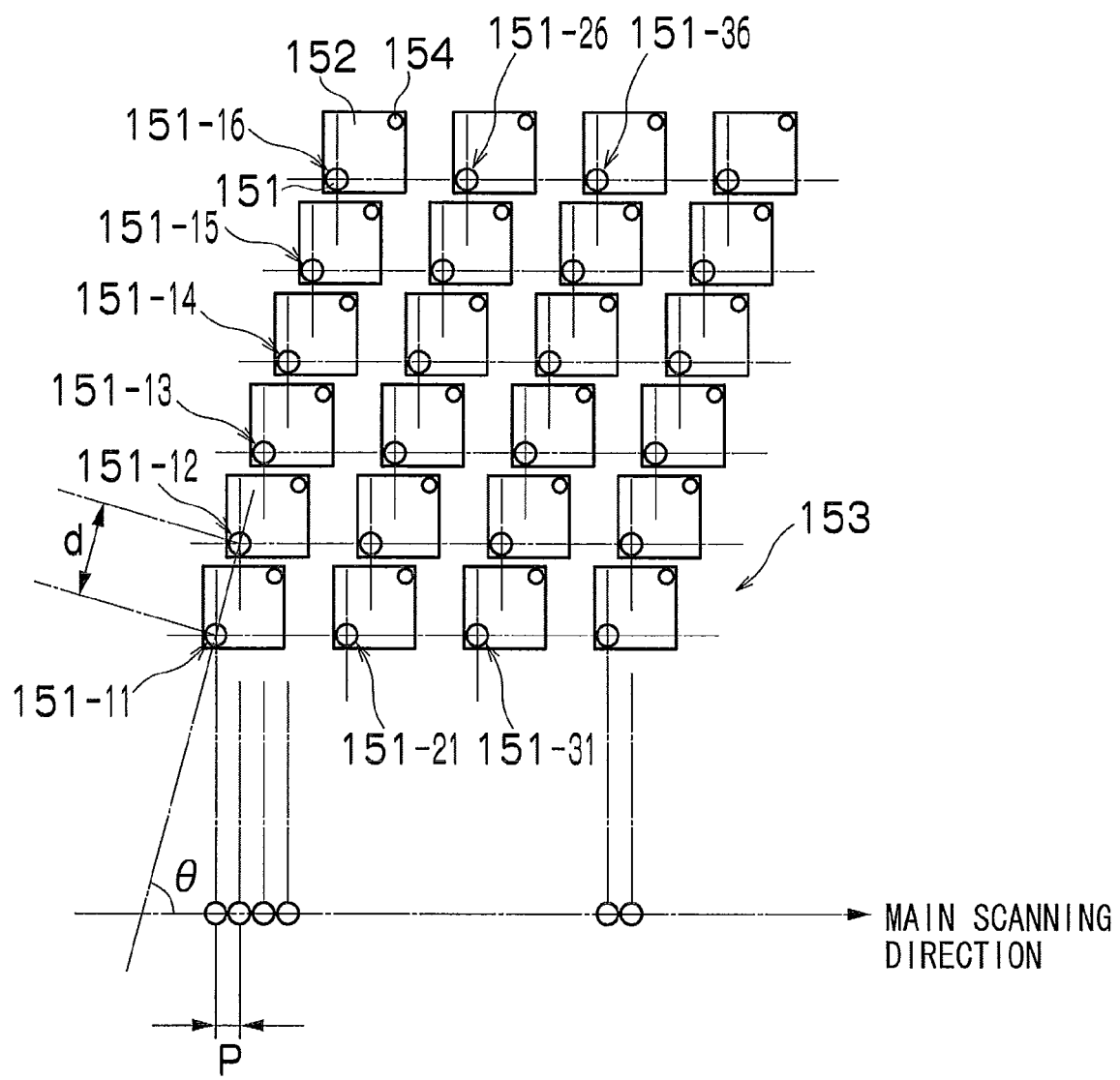
FIG. 15 is an enlarged view showing a nozzle arrangement in the print head shown in FIGS. 13A and 13B.

As shown in FIG. 15, the high-density nozzle head according to the present embodiment is achieved by arranging the plurality of ink chamber units 153 having the above-described structure in a lattice fashion based on a fixed arrangement pattern, in a row direction which coincides with the main scanning direction, and a column direction which is inclined at a fixed angle of θ with respect to the main scanning direction, rather than being perpendicular to the main scanning direction.

More specifically, by adopting the structure in which the plurality of ink chamber units 153 are arranged at a uniform pitch d in line with a direction forming the angle of θ with respect to the main scanning direction, the pitch P of the nozzles projected so as to align in the main scanning direction is d×cos θ, and hence the nozzles 151 can be regarded to be equivalent to those arranged linearly at the fixed pitch P along the main scanning direction. Such configuration results in a nozzle structure in which the nozzle row projected in the main scanning direction has a high nozzle density of up to 2,400 nozzles per inch.

In a full-line head comprising rows of nozzles that have a length corresponding to the entire width of the image recordable width, the "main scanning" is defined as printing one line (a line formed of a row of dots, or a line formed of a plurality of rows of dots) in the width direction of the recording paper (the direction perpendicular to the conveyance direction of the recording paper) by driving the nozzles in one of the following ways: (1) simultaneously driving all the nozzles; (2) sequentially driving the nozzles from one side toward the other; and (3) dividing the nozzles into blocks and sequentially driving the nozzles from one side toward the other in each of the blocks.

In particular, when the nozzles 151 arranged in a matrix such as that shown in FIG. 15 are driven, the main scanning according to the above-described (3) is preferred. More specifically, the nozzles 151-11, 151-12, 151-13, 151-14, 151-15 and 151-16 are treated as a block (additionally; the nozzles 151-21, 151-22, . . . , 151-26 are treated as another block; the nozzles 151-31, 151-32, . . . , 151-36 are treated as another block; . . . ); and one line is printed in the width direction of the recording paper 116 by sequentially driving the nozzles 151-11, 151-12, . . . , 151-16 in accordance with the conveyance velocity of the recording paper 116.

On the other hand, "sub-scanning" is defined as to repeatedly perform printing of one line (a line formed of a row of dots, or a line formed of a plurality of rows of dots) formed by the main scanning, while moving the full-line head and the recording paper relatively to each other.

The direction indicated by one line (or the lengthwise direction of a band-shaped region) recorded by main scanning as described above is referred to as the "main scanning direction", and the direction in which sub-scanning is performed, is referred to as the "sub-scanning direction". In other words, in the present embodiment, the conveyance direction of the recording paper 116 is referred to as the sub-scanning direction and the direction perpendicular to same is referred to as the main scanning direction.

In implementing the present invention, the arrangement of the nozzles is not limited to that of the embodiment shown. Moreover, a method is employed in the present embodiment where an ink droplet is ejected by means of the deformation of the actuator 158, which is typically a piezoelectric element; however, in implementing the present invention, the method used for discharging ink is not limited in particular, and instead of the piezo jet method, it is also possible to apply various types of methods, such as a thermal jet method where the ink is heated and bubbles are caused to form therein by means of a heat generating body such as a heater, ink droplets being ejected by means of the pressure applied by these bubbles.

Description of Control System

Figure 16:
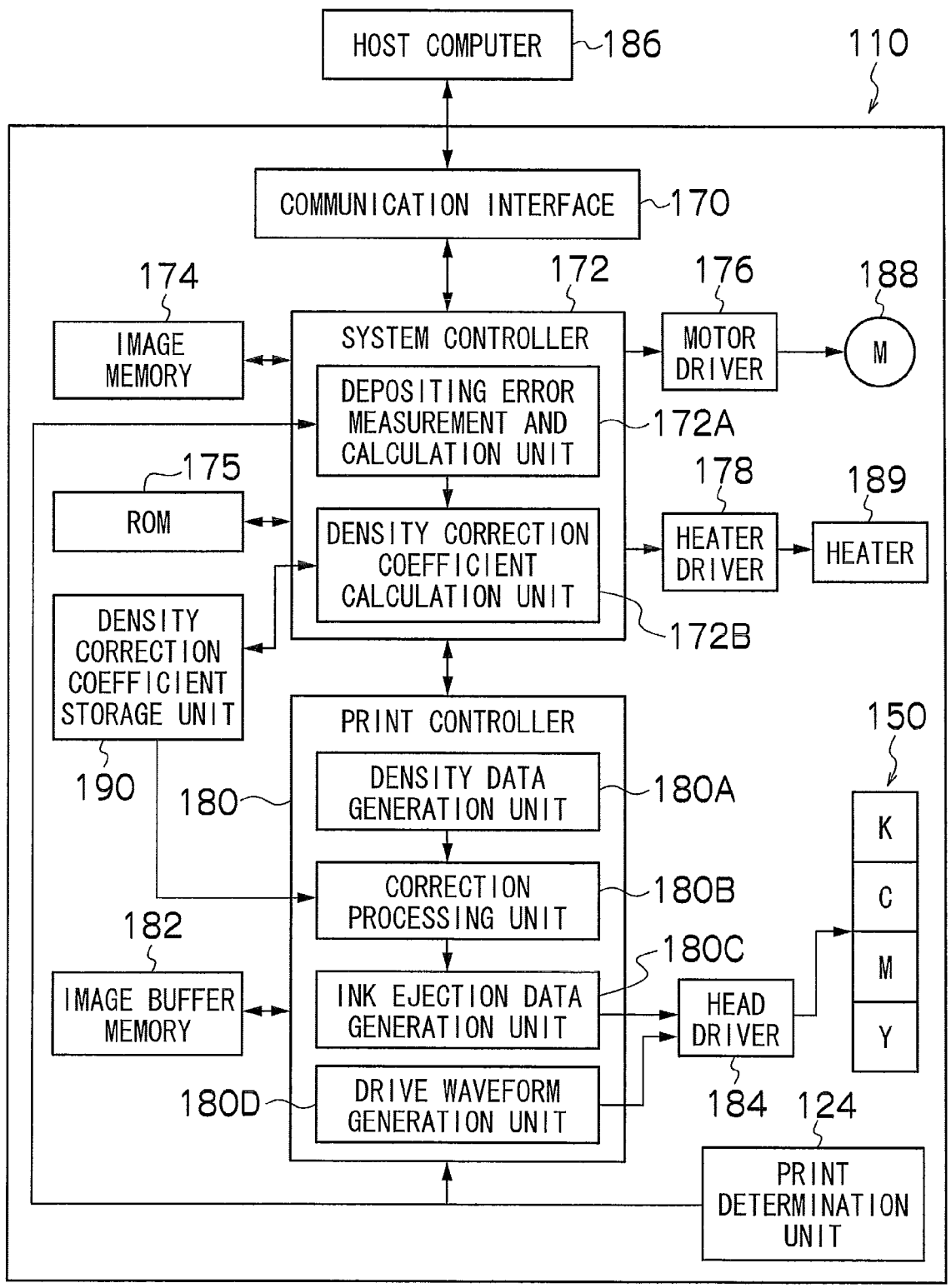
FIG. 16 is a principal block diagram showing the system configuration of the inkjet recording apparatus.

FIG. 16 is a block diagram showing the system configuration of the inkjet recording apparatus 110. As shown in FIG. 16, the inkjet recording apparatus 110 comprises a communication interface 170, a system controller 172, an image memory 174, a ROM 175, a motor driver 176, a heater driver 178, a print controller 180, an image buffer memory 182, a head driver 184, and the like.

The communication interface 170 is an interface unit (image input device) for receiving image data sent from a host computer 186. A serial interface such as USB (Universal Serial Bus), IEEE1394, Ethernet (registered trademark), and wireless network, or a parallel interface such as a Centronics interface may be used as the communication interface 170. A buffer memory (not shown) may be mounted in this portion in order to increase the communication speed.

The image data sent from the host computer 186 is received by the inkjet recording apparatus 110 through the communication interface 170, and is temporarily stored in the image memory 174. The image memory 174 is a storage device for storing images inputted through the communication interface 170, and data is written and read to and from the image memory 174 through the system controller 172. The image memory 174 is not limited to a memory composed of semiconductor elements, and a hard disk drive or another magnetic medium may be used.

The system controller 172 is constituted by a central processing unit (CPU) and peripheral circuits thereof, and the like, and it functions as a control device for controlling the whole of the inkjet recording apparatus 110 in accordance with a prescribed program, as well as a calculation device for performing various calculations. More specifically, the system controller 172 controls the various sections, such as the communication interface 170, image memory 174, motor driver 176, heater driver 178, and the like, as well as controlling communications with the host computer 186 and writing and reading to and from the image memory 174 and the ROM 175, and it also generates control signals for controlling the motor 188 and heater 189 of the conveyance system.

Furthermore, the system controller 172 comprises a depositing error measurement and calculation unit 172A, which performs calculation processing for generating depositing position error data from the data read in from the test pattern by the print determination unit 124, and a density correction coefficient calculation unit 172B, which sets virtual deposited droplet and calculates density correction coefficients from the information relating to the depositing position error obtained by the depositing error measurement and calculation unit 172A. The processing functions of the depositing error measurement and calculation unit 172A and the density correction coefficient calculation unit 172B can be achieved by means of an ASIC (application specific integrated circuit), software, or a suitable combination of same.

The density correction coefficient data obtained by the density correction coefficient calculation unit 172B is stored in a density correction coefficient storage unit 190.

The program executed by the CPU of the system controller 172 and the various types of data (including data of the test pattern for obtaining depositing position error) which are required for control procedures are stored in the ROM 175. The ROM 175 may be a non-writeable storage device, or it may be a rewriteable storage device, such as an EEPROM. By utilizing the storage region of this ROM 175, the ROM 175 can be configured to be able to serve also as the density correction coefficient storage unit 190.

The image memory 174 is used as a temporary storage region for the image data, and it is also used as a program development region and a calculation work region for the CPU.

The motor driver (drive circuit) 176 drives the motor 188 of the conveyance system in accordance with commands from the system controller 172. The heater driver (drive circuit) 178 drives the heater 189 of the post-drying unit 142 or the like in accordance with commands from the system controller 172.

The print controller 180 is a control unit which functions as a signal processing device for performing various treatment processes, corrections, and the like, in accordance with the control implemented by the system controller 172, in order to generate a signal for controlling droplet ejection from the image data (multiple-value input image data) in the image memory 174, as well as functioning as a drive control device which controls the ejection driving of the head 150 by supplying the ink ejection data thus generated to the head driver 184.

In other words, the print controller 180 includes a density data generation unit 180A, a correction processing unit 180B, an ink ejection data generation unit 180C and a drive waveform generation unit 180D. These functional units (180A to 180D) can be realized by means of an ASIC, software or a suitable combination of same.

The density data generation unit 180A is a signal processing device which generates initial density data for the respective ink colors, from the input image data, and it carries out density conversion processing (including UCR processing and color conversion) described in step S22 in FIG. 7, and, where necessary, it also performs pixel number conversion processing.

The correction processing unit 180B in FIG. 16 is a processing device which performs density correction calculations using the density correction coefficients stored in the density correction coefficient storage unit 190, and it carries out the non-uniformity correction processing described in step S24 in FIG. 7.

The ink ejection data generation unit 180C in FIG. 16 is a signal processing device which includes a half-toning processing device for converting the corrected density data generated by the correction processing unit 180B into binary (or multiple-value) dot data, and it performs the binary (or multiple-value) conversion processing described in step S26 of FIG. 7. The ink ejection data generated by the ink ejection data generation unit 180 is supplied to the head driver 184, which controls the ink ejection operation of the head 150 accordingly.

The drive waveform generation unit 180D is a device for generating drive signal waveforms in order to drive the actuators 158 (see FIG. 14) corresponding to the respective nozzles 151 of the head 150. The signal (drive waveform) generated by the drive waveform generation unit 180D is supplied to the head driver 184. The signal outputted from the drive waveforms generation unit 180D may be digital waveform data, or it may be an analog voltage signal.

The image buffer memory 182 is provided in the print controller 180, and image data, parameters, and other data are temporarily stored in the image buffer memory 182 when image data is processed in the print controller 180. FIG. 16 shows a mode in which the image buffer memory 182 is attached to the print controller 180; however, the image memory 174 may also serve as the image buffer memory 182. Also possible is a mode in which the print controller 180 and the system controller 172 are integrated to form a single processor.

To give a general description of the sequence of processing from image input to print output, image data to be printed (original image data) is inputted from an external source through the communication interface 170, and is accumulated in the image memory 174. At this stage, multiple-value RGB image data is stored in the image memory 174, for example.

In this inkjet recording apparatus 110, an image which appears to have a continuous tonal graduation to the human eye is formed by changing the deposition density and the dot size of fine dots created by ink (coloring material), and therefore, it is necessary to convert the input digital image into a dot pattern which reproduces the tonal graduations of the image (namely, the light and shade toning of the image) as faithfully as possible. Therefore, original image data (RGB data) stored in the image memory 174 is sent to the print controller 180, through the system controller 172, and is converted to the dot data for each ink color by a half-toning technique, using dithering, error diffusion, or the like, by passing through the density data generation unit 180A, the correction processing unit 180B, and the ink ejection data generation unit 180C of the print controller 180.

In other words, the print controller 180 performs processing for converting the input RGB image data into dot data for the four colors of K, C, M and Y. The dot data thus generated by the print controller 180 is stored in the image buffer memory 182. This dot data of the respective colors is converted into CMYK droplet ejection data for ejecting ink from the nozzles of the head 150, thereby establishing the ink ejection data to be printed.

The head driver 184 outputs drive signals for driving the actuators 158 corresponding to the nozzles 151 of the head 150 in accordance with the print contents, on the basis of the ink ejection data and the drive waveform signals supplied by the print controller 180. A feedback control system for maintaining constant drive conditions in the head may be included in the head driver 184.

By supplying the drive signals outputted by the head driver 184 to the head 150 in this way, ink is ejected from the corresponding nozzles 151. By controlling ink ejection from the print head 150 in synchronization with the conveyance speed of the recording paper 116, an image is formed on the recording paper 116.

As described above, the ejection volume and the ejection timing of the ink droplets from the respective nozzles are controlled through the head driver 184, on the basis of the ink ejection data generated by implementing prescribed signal processing in the print controller 180, and the drive signal waveform. By this means, prescribed dot size and dot positions can be achieved.

As described with reference to FIG. 11, the print determination unit 124 is a block including an image sensor, which reads in the image printed on the recording medium 116, performs various signal processing operations, and the like, and determines the print situation (presence/absence of ejection, variation in droplet ejection, optical density, and the like), these determination results being supplied to the print controller 180 and the system controller 172.

The print controller 180 implements various corrections with respect to the head 150, on the basis of the information obtained from the print determination unit 124, according to requirements, and it implements control for carrying out cleaning operations (nozzle restoring operations), such as preliminary ejection, suctioning, or wiping, as and when necessary.

In the case of the present embodiment, the combination of the print determination unit 124 and the depositing error measurement calculation unit 172A corresponds to the "characteristics information acquisition device", and the density correction coefficient calculation unit 172B corresponds to the device that calculates "density correction data". Furthermore, the correction processing unit 180B corresponds to the "correction calculation device", the "nearest recording point specifying device"; the "sum density calculation device", the "comparison device", and the "image data modification device".

According to the inkjet recording apparatus 110 having the foregoing composition, it is possible to obtain a satisfactory image in which density non-uniformity caused by depositing position error is reduced.

Practical Examples

Actual Operating Results

Next, the results of operation in an actual inkjet recording apparatus are described. The practical examples described below relate to a case where one type of dot is used.

Figure 17:
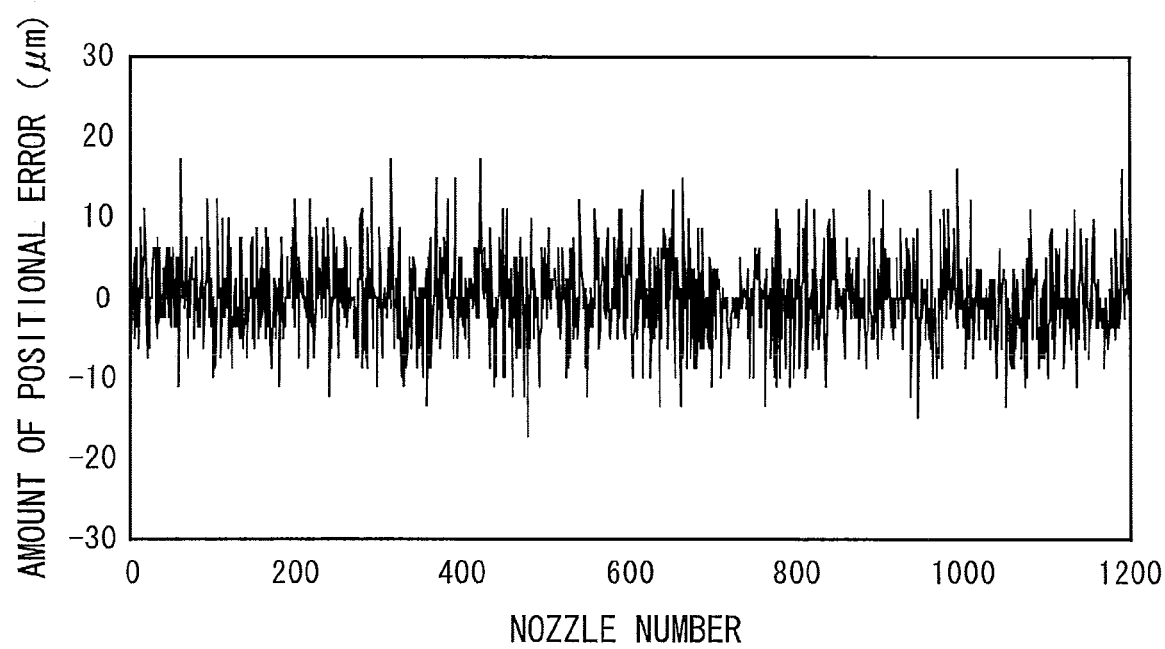
FIG. 17 is a diagram showing an example of the measurement of droplet depositing position error.

FIG. 17 is an example of droplet deposition error data. The horizontal axis indicates the nozzle position (x: 0 to 1199) and the amount of positional error on the vertical axis is indicated as an amount of deviation ($\Delta x$) from the standard position (1200 dpi grid).

The density distribution Dd(x) of the respective nozzles is determined and on the basis of this, a density distribution look-up table (LUT) is created.

<About Creating Density Distribution LUT>

The method of calculating dot densities from the droplet depositing position error data shown in FIG. 17 uses the method described in U.S. Pat. No. 7,484,824 explained above.

Since correction values can be calculated by this method, dot densities can be obtained by converting these correction values as follows:

"Dot density"="Standard dot density"×"Correction value".

In this case, a density distribution LUT (Dd(x), x=nozzle) is created taking the standard dot density as 1.

FIG. 18 shows an example of a density distribution LUT obtained in this way. In FIG. 18, only a portion of the nozzles (0 to 19) are shown, but the density distribution LUT includes data for all of the nozzles (in the present example, nozzle numbers 0 to 1199).

Figure 19:
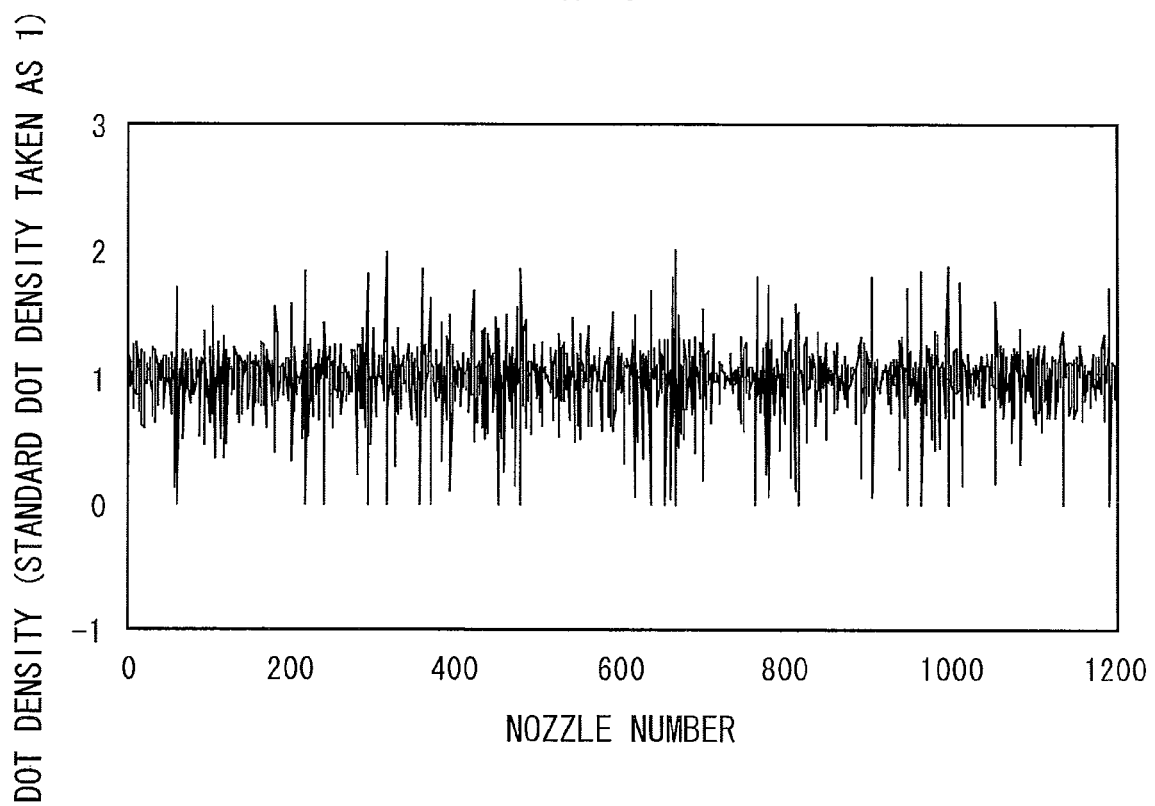
FIG. 19 is an illustrative diagram showing a density distribution look-up table in the form of a graph.

FIG. 19 shows a density distribution LUT in the form of a graph, in which the horizontal axis indicates the nozzle number and the vertical axis indicates the dot density. The density distribution LUT shown in FIGS. 20 and 21 is stored in a memory, which can be referenced by the control block that controls the image processing.

<Output Image Results (Effect in Reducing Non-Uniformity in Reflective Density)>

Figure 20A:
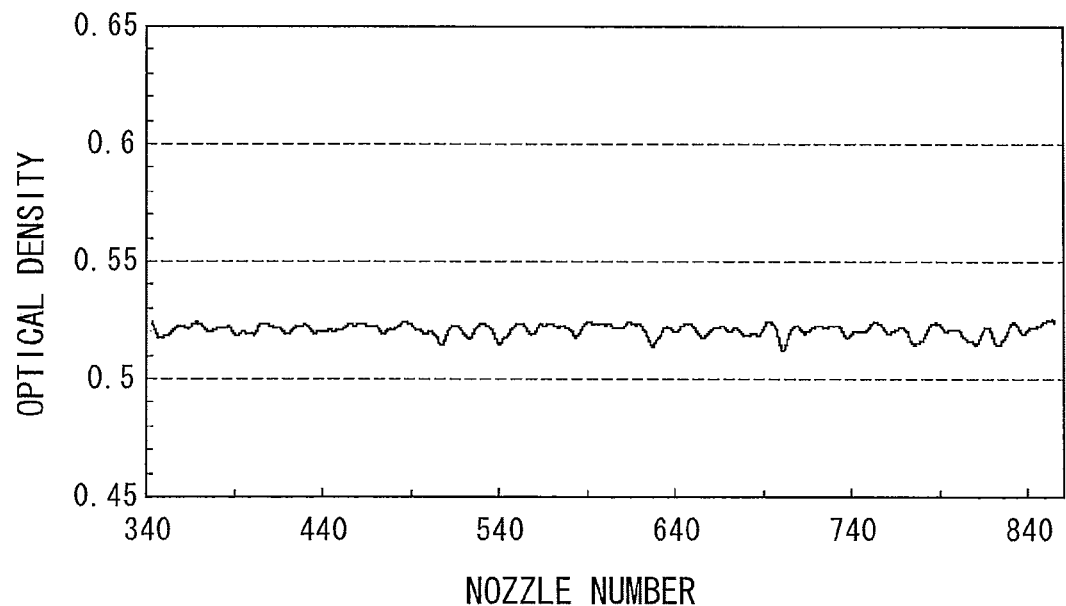
FIG. 20A is a diagram showing image output results in an embodiment of the present invention.
Figure 20B:
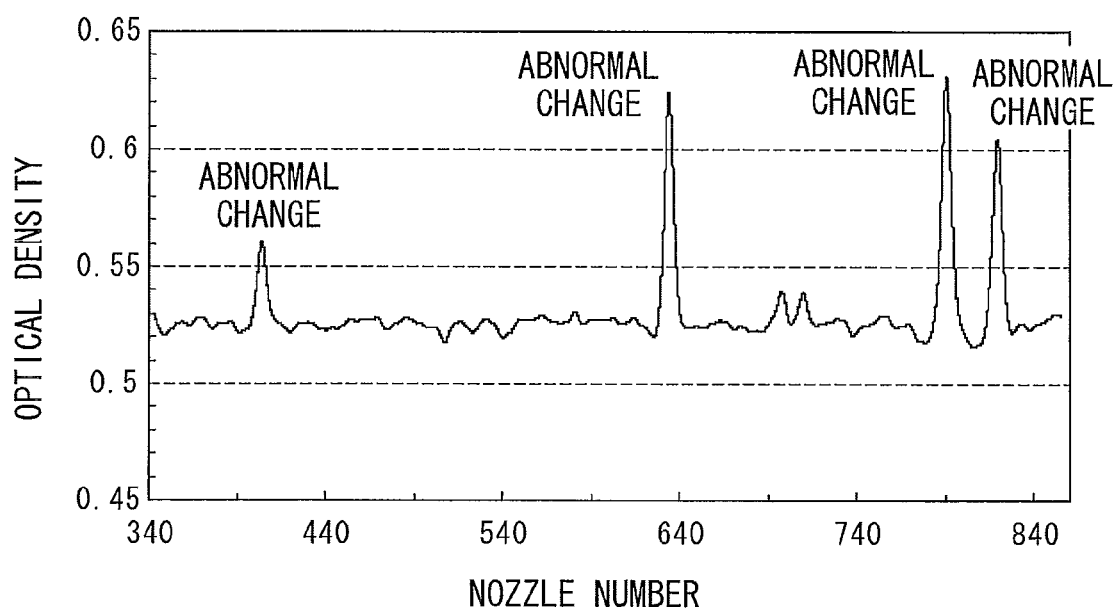
FIG. 20B is a diagram showing image output results in the related art.
Figure 21:
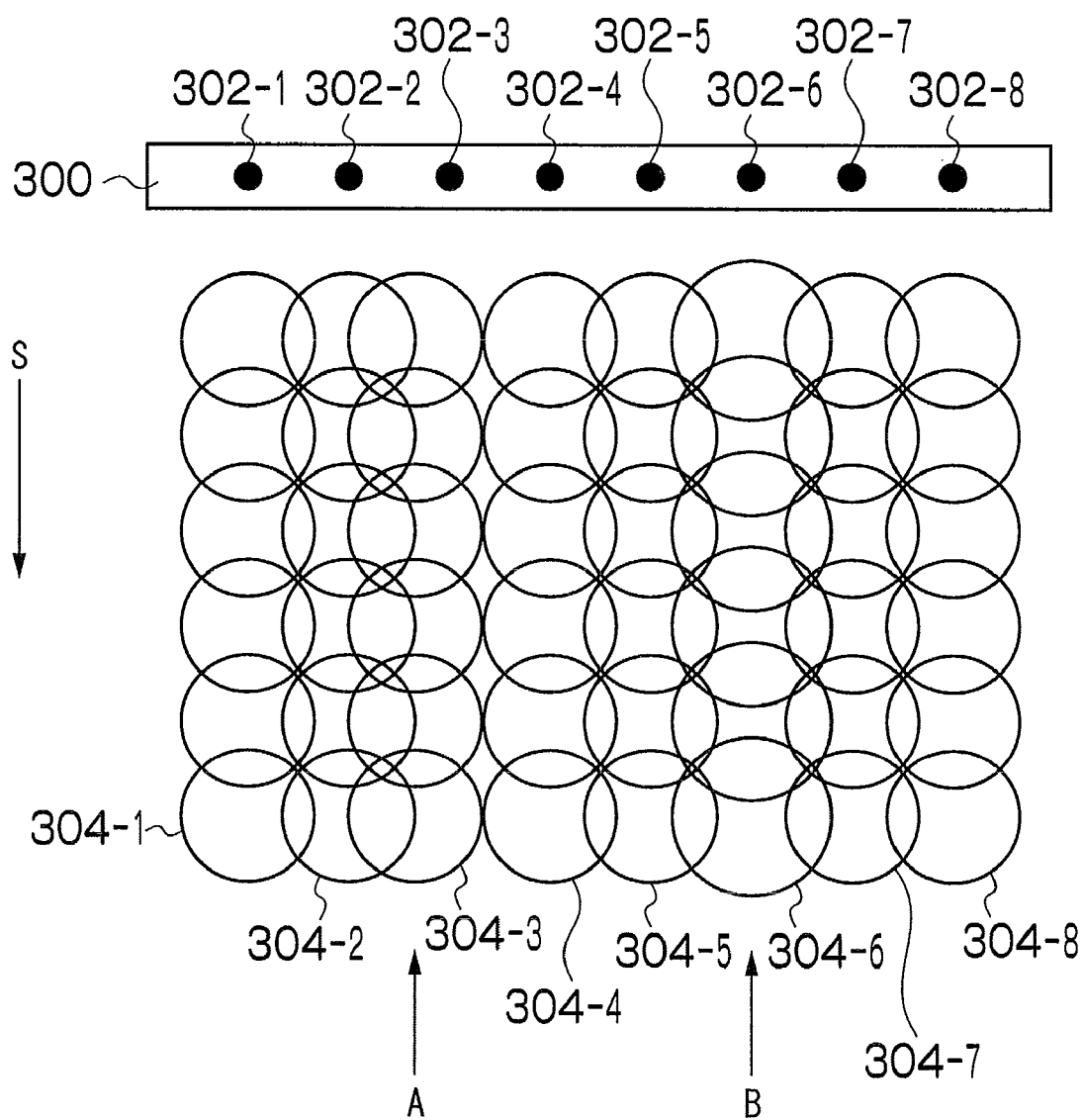
FIG. 21 is a schematic drawing for describing the relationship between variation in the ejection characteristics of the nozzles, and density non-uniformity, in the related art.

FIG. 20A shows the results of image output created by applying the image processing method according to an embodiment of the present invention. For the purpose of comparison, FIG. 20B shows the results of image output created by applying a method in the related art (a normal error diffusion method). Both of these graphs show the variation in the reflective density of the output image (O.D.) for the same droplet depositing position error; the horizontal axis indicates the nozzle position.

When FIGS. 20A and 20B are compared, the image processing method of the present embodiment eliminates abnormal variation that is visible in the reflective density of the output image, and reduces non-uniformity in the reflective density caused by variation in the depositing positions of the ejected droplets, compared to the image processing method in the related art.

Modified Embodiment 1

It is also possible to adopt a mode in which all or a portion of the functions carried out by the depositing error measurement calculation unit 172A, the density correction coefficient calculation unit 172B, the density data generation unit 180A and the correction processing unit 180B, which are described in FIG. 16, are installed in the host computer 186.

Modified Embodiment 2

FIGS. 11 to 16 show the composition where a test pattern is read in by a print determination unit 124 which is provided in an inkjet recording apparatus 110, and a calculation processing function for obtaining deposition error data and a calculation processing function for determining density correction coefficients are incorporated into the system controller (reference numeral 172 in FIG. 16) and/or the print controller (reference numeral 180) of the inkjet recording apparatus 110, in such a manner that the calculation processing is carried out inside the inkjet recording apparatus 110. However, it is also possible to achieve these functions by means of an image reading apparatus which is a device for reading in a test pattern. Moreover, it is also possible to perform these functions by means of an apparatus that is external to the printer so that the image data obtained from the image reading apparatus is processed.

For example, it is also possible to use a flat-bed scanner, or the like, as the image reading apparatus which reads in the test pattern. Furthermore, it is also possible to adopt a composition which uses a computer other than the inkjet recording apparatus 110, as a calculation device for analyzing the data which has been read in and calculating the density correction coefficients. In this case, a program which causes a computer to execute an image analysis algorithm used in measuring the depositing error data, an algorithm for calculating the density correction coefficients, an algorithm for correction processing of the image data, and an algorithm for converting the corrected image data to the dot data, and the like is installed in the computer, and the computer is made to function as the calculation apparatus (the image processing apparatus) by running this program.

Modified Embodiment 3

In the respective embodiments described above, an inkjet recording apparatus using a page-wide full line type head having a nozzle row of a length corresponding to the entire width of the recording medium was described, but the scope of application of the present invention is not limited to this, and beneficial corrective effects can also be obtained in respect of banding non-uniformities in an inkjet recording apparatus which performs image recording by means of a plurality of head scanning actions which move a short recording head, such as a serial head (shuttle scanning head), or the like.

In the embodiment described above, the inkjet recording apparatus is described as one example of an image forming apparatus, but the range of application of the present invention is not limited to this. It is also possible to apply the present invention to image recording apparatuses employing various types dot recording methods, apart from an inkjet apparatus, such as a thermal transfer recording apparatus equipped with a recording head which uses thermal elements are recording elements, an LED electrophotographic printer equipped with a recording head having LED elements as recording elements, or a silver halide photographic printer having an LED line type exposure head, or the like.

Moreover, the meaning of the term "image recording apparatus" is not restricted to a so-called graphic printing application for printing photographic prints or posters, but rather also encompasses industrial apparatuses which are able to form patterns that may be perceived as images, such as resist printing apparatuses, wire printing apparatuses for electronic circuit substrates, ultra-fine structure forming apparatuses, etc., which use inkjet technology.

Furthermore, the range of application of the present invention is not limited to the correction of density non-uniformities caused by error in depositing position, and a correction effect can also be obtained by applying a method similar to the above-described correction processing to density non-uniformities caused by droplet volume errors, density non-uniformities caused by the presence of nozzles suffering ejection failure, density non-uniformities caused by periodic print errors, and density non-uniformities caused by various other types of factors.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image recording apparatus which records an image on a recording medium, comprising:
   a recording head which has a plurality of recording elements;
   a conveyance device which conveys at least one of the recording head and the recording medium so that the recording head and the recording medium move relatively to each other;
   a characteristics information acquisition device which acquires characteristics information that indicates recording characteristics of the respective recording elements;
   a correction calculation device which corrects image data corresponding to the respective recording elements by using at least recording point positional deviation information within the acquired characteristics information, and generates image data that suppresses a non-uniformity streak occurring in an output image due to the recording characteristics;
   a nearest recording point specifying device which specifies, in a case where an image density value indicated by the image data corrected by the correction calculation device is out of an output image density range of the recording head, a second recording element concerning a recording position nearest to a recording position of a first recording element corresponding to first image data that is out of the output image density range;
   a sum density calculation device which calculates a sum density of the first image data and second image data, the first image data corresponding to the first recording element, the second image data corresponding to the specified second recording element and having been corrected by the correction calculation device for the image data corresponding to the specified second recording element;
   an image data modification device which preserves the sum density calculated by the sum density calculation device, while distributing the sum density to respective image data corresponding to the first recording element and the second recording element, at values within the output density range; and
   a drive control device which controls driving of the recording head in accordance with the image data corrected by the correction calculation device and the image data modified by the image data modification device.

2. The image recording apparatus as defined in claim 1, wherein the correction calculation device includes a density correction data calculation device which calculates density non-uniformity caused by the recording characteristics of the recording elements and calculates density correction data in accordance with correction conditions which reduce a low-frequency component of a power spectrum that represents spatial frequency characteristics of the density non-uniformity, and the correction calculation device performs correction of the image data by using the calculated density correction data.

3. The image recording apparatus as defined in claim 1, wherein the image data modification device divides the sum density into two equal parts to be distributed to the respective image data corresponding to the first recording element and the second recording element.

4. The image recording apparatus as defined in claim 1, wherein the image data modification device performs distribution, with an upper limit value of the output image density range being set for one of the image data having higher density, of the first image data and the second image data, while a remainder of the sum density minus the upper limit value being set for the other one of the image data.

5. The image recording apparatus as defined in claim 1, wherein the image data modification device performs distribution, with a lower limit value of the output image density range being set for one of the image data having lower density, of the first image data and the second image data, while a remainder of the sum density minus the lower limit value being set for the other one of the image data.

6. The image recording apparatus as defined in claim 1, further comprising:
   a comparison device which compares the image density value indicated by the first image data with an upper limit value and a lower limit value of the output image density range, wherein:
   if the image density value indicated by the first image data is higher than the upper limit value, then the image data modification device performs distribution, with the upper limit value being set for the image data corresponding to the first recording element, while a remainder of the sum density minus the upper limit value being set for the image data corresponding to the second recording element; and
   if the image density value indicated by the first image data is lower than the lower limit value, then the image data modification device performs distribution, with the lower limit value being set for the image data corresponding to the first recording element, while a remainder of the sum density minus the lower limit value being set for the image data corresponding to the second recording element.

7. A method of recording an image on a recording medium by a plurality of recording elements of a recording head, while moving the recording head and the recording medium relatively to each other by conveying at least one of the recording head and the recording medium, the method comprising:
   a characteristics information acquisition step of acquiring characteristics information that indicates recording characteristics of the respective recording elements;
   a correction calculation step of correcting image data corresponding to the respective recording elements by using at least recording point positional deviation information within the acquired characteristics information, and generating image data that suppresses a non-uniformity streak occurring in an output image due to the recording characteristics;
   a nearest recording point specifying step of specifying, in a case where an image density value indicated by the image data corrected in the correction calculation step is out of an output image density range of the recording head, a second recording element concerning a recording position nearest to a recording position of a first recording element corresponding to first image data that is out of the output image density range;
   a sum density calculation step of calculating a sum density of the first image data and second image data, the first image data corresponding to the first recording element, the second image data corresponding to the specified second recording element and having been corrected in the correction calculation step for the image data corresponding to the specified second recording element;

an image data modification step of preserving the sum density calculated in the sum density calculation step while distributing the sum density to respective image data corresponding to the first recording element and the second recording element, at values within the output density range; and a drive control step of controlling driving of the recording head in accordance with the image data corrected in the correction calculation step and the image data modified in the image data modification step.

8. A non-transitory computer readable medium having embodied thereon a computer program for causing a computer to operate:

a characteristics information acquisition function of acquiring characteristics information that indicates recording characteristics of a plurality of recording elements of a recording head;

a correction calculation function of correcting image data corresponding to the respective recording elements by using at least recording point positional deviation information within the acquired characteristics information, and generating image data that suppresses a non-uniformity streak occurring in an output image due to the recording characteristics;

a nearest recording point specifying function of specifying, in a case where an image density value indicated by the image data corrected with the correction calculation function is out of an output image density range of the recording head, a second recording element concerning a recording position nearest to a recording position of a first recording element corresponding to first image data that is out of the output image density range;

a sum density calculation function of calculating a sum density of the first image data and second image data, the first image data corresponding to the first recording element, the second image data corresponding to the specified second recording element and having been corrected with the correction calculation function for the image data corresponding to the specified second recording element; and an image data modification function of preserving the sum density calculated with the sum density calculation function while distributing the sum density to respective image data corresponding to the first recording element and the second recording element, at values within the output density range.

* * * * *